(12) United States Patent
Ikeuchi et al.

(10) Patent No.: US 10,862,381 B2
(45) Date of Patent: Dec. 8, 2020

(54) ROTARY ELECTRICAL MACHINE

(71) Applicant: M-LINK CO., LTD., Yamato (JP)

(72) Inventors: Toru Ikeuchi, Yamato (JP); Manabu Shiraki, Yamato (JP)

(73) Assignee: CORELESS MOTOR CO., LTD., Kanagawa (JP)

( * ) Notice: Subject to any disclaimer, the term of this patent is extended or adjusted under 35 U.S.C. 154(b) by 594 days.

(21) Appl. No.: 15/305,924

(22) PCT Filed: Dec. 19, 2014

(86) PCT No.: PCT/JP2014/083700
§ 371 (c)(1),
(2) Date: Oct. 21, 2016

(87) PCT Pub. No.: WO2015/162826
PCT Pub. Date: Oct. 29, 2015

(65) Prior Publication Data
US 2017/0047833 A1 Feb. 16, 2017

(30) Foreign Application Priority Data
Apr. 23, 2014 (JP) .................................. 2014-088728

(51) Int. Cl.
*H02K 16/02* (2006.01)
*H02K 21/12* (2006.01)
(Continued)

(52) U.S. Cl.
CPC .............. *H02K 16/02* (2013.01); *H02K 1/27* (2013.01); *H02K 5/1735* (2013.01); *H02K 7/083* (2013.01);
(Continued)

(58) Field of Classification Search
CPC ........ H02K 1/2793; H02K 16/02; H02K 21/24
See application file for complete search history.

(56) References Cited

U.S. PATENT DOCUMENTS 9,219,395 B2 * 12/2015 Powell ................. H02K 7/1823
2007/0152536 A1   7/2007 Chuang et al.
2012/0187787 A1   7/2012 Saito

FOREIGN PATENT DOCUMENTS

CN      201466945      5/2010
JP      57-25143 A     2/1982
(Continued)

OTHER PUBLICATIONS

First Office Action issued in corresponding Chinese Patent Application No. 201480078153.6, dated May 21, 2018 with English Translation (32 pages).
(Continued)

*Primary Examiner* — Ramon M Barrera
(74) *Attorney, Agent, or Firm* — Buchanan Ingersoll & Rooney PC

(57) ABSTRACT

A rotary electrical machine has a first annular body and a second annular body that face opposite each other with a coil interposed therebetween, either the first annular body or the second annular body being provided with a permanent magnet, the first annular body and/or the second annular body rotating about the axis of a rotating shaft, and the driving force of a motor being extracted through the rotating first annular body or second annular body or through the axis of the rotating shaft rotating with the rotating first annular body or second annular body.

4 Claims, 16 Drawing Sheets

(51) Int. Cl.
*H02K 21/24* (2006.01)
*H02K 7/08* (2006.01)
*H02K 5/173* (2006.01)
*H02K 1/27* (2006.01)
*H02K 21/22* (2006.01)
*H02K 21/14* (2006.01)

(52) U.S. Cl.
CPC ............ *H02K 7/085* (2013.01); *H02K 21/12* (2013.01); *H02K 21/24* (2013.01); *H02K 1/2706* (2013.01); *H02K 1/2786* (2013.01); *H02K 21/14* (2013.01); *H02K 21/22* (2013.01)

(56) References Cited

FOREIGN PATENT DOCUMENTS

| | | | |
|---|---|---|---|
| JP | 11-341757 A | 12/1999 | |
| JP | 2004-173475 A | 6/2004 | |
| JP | 2009-292439 A | 12/2009 | |
| JP | 2011217484 A | 10/2011 | |
| JP | 2012157087 A | 8/2012 | |
| WO | WO-2013056458 A1 * | 4/2013 | ........... H02K 21/024 |

OTHER PUBLICATIONS

Second Office Action issued in corresponding Chinese Patent Application No. 201480078153.6, dated Feb. 1, 2019, with English Translation (33 pages).
International Search Report (PCT/ISA/210) dated Mar. 17, 2015, by the Japan Patent Office as the International Searching Authority for International Application No. PCT/JP2014/083700.
Written Opinion (PCT/ISA/237) dated Mar. 17, 2015, by the Japan Patent Office as the International Searching Authority for International Application No. PCT/JP2014/083700.

* cited by examiner

ROTARY ELECTRICAL MACHINE

BACKGROUND

Technical Field

The present invention relates to a rotary electrical machine.

Description of the Prior Art

As it is known to the prior are, a rotary electrical machine includes a first annular body (one typical example of which is the inner core) and a second annular body (one typical example of which is the outer core) with a coil interposed therebetween and either of which is provided with a permanent magnet (as described in Patent Document 1, for example).

FIG. 1 is a sectional view illustrating one example of the conventional rotary electrical machine shown in FIG. 1 although some component parts are omitted.

The axis of a rotating shaft 2 that acts as the rotating shaft is supported rotatably by means of a bearing assembly 9 within a housing 8. In the embodiment shown in FIG. 1, the bearing assembly 9 includes a bearing 9a and a bearing 9b that are spaced away from each other at a predetermined interval in the axial direction of the axis of the rotating shaft 2.

On the axis of the rotating shaft 2, an inner rotor 4 is supported concentrically. The inner rotor 4 has a permanent magnet 5 mounted on the outer circumference thereof. An outer rotor 7 is arranged on the outer side of the permanent magnet 5 with a coil interposed therebetween. A magnetic field may be developed between the inner rotor 4 and the outer rotor 7. In this embodiment, the inner rotor 4 is provided to correspond to the first annular body and the outer rotor 7 is provided to correspond to the second annular body, for example.

In the rotary electrical machine shown in FIG. 1, the inner rotor 4 is supported on the axis of the rotating shaft 2 by way of a hub 3 and the outer rotor 7 is mounted fixedly.

When the coil 6 is energized so that it can be conducted electrically, it produces an electromagnetic force within the magnetic field described above, which causes the permanent magnet 5 to be rotated in the direction of an arrow 12, for example. As the permanent magnet 5 is rotated, it also causes the axis of the rotating shaft 2 to rotate in the direction of the arrow 12.

Because the outer rotor 7 is fixed to the inner rotor 4, the outer rotor 7 is also caused to rotate with the permanent magnet 5 in the direction of the arrow as the permanent magnet 5 is rotated in the direction of the arrow 12.

As a result, the axis of the rotating shaft 2 provides the inertial action that may be increased by the weight of the outer rotor 7. This may adversely affect the response time from the time when the coil 6 is energized so that it can be conducted electrically to the time when the axis of the rotating shaft reaches its assumed number of revolutions.

In the rotary electrical machine shown in FIG. 1, the driving force of the motor may be extracted from the axis of rotating shaft 2 that acts as the rotating shaft.

Like the embodiment shown in FIG. 1, it is also known that there is another conventional rotary electrical machine that is based on the direct drive system in which the inner rotor and the outer rotor can rotate together and the driving force is extracted from the outer rotor.

In any system on which the rotary electrical machine is based and in the case where the inner rotor and the outer rotor rotate together when the rotating body from which the driving force is extracted is rotated, the inertial action of the rotating body from which the driving force of the motor is extracted may adversely be affected by the combination of the inner rotor and the outer rotor which are rotating together. This may also adversely affect the response time up to the time when the rotating body from which the driving force is extracted can reach its assumed number of revolutions.

Differently from the system in which the inner rotor 4 and the outer rotor 7 rotate together as shown in FIG. 1, it is known that there is another rotary electrical machine that is based on the system in which the outer yoke that is provided to correspond to the outer rotor in the rotary electrical machine shown in FIG. 1 is fixed and is therefore non-rotational.

In the above system, only the inner rotor on which the permanent magnet is mounted rotates. As such, the rotor can provide the inertial moment that is smaller than the system in which the inner rotor and the outer rotor are combined so that they can rotate together. As a result, it is found that the response time from the time when the coil is energized so that it can be conducted electrically to the time when the rotating body from which the driving force of the motor is extracted can reach its assumed number of revolutions is shorter than that for the system in which the inner rotor 4 and the outer rotor 7 as shown in FIG. 1 are combined so that they can rotate together.

It is also found, however, that the conventional rotary electrical machine which is based on the system in which the outer yoke that is provided to correspond to the outer rotor in the rotary electrical machine in FIG. 1 is fixed and is therefore non-rotational and only the inner rotor on which the permanent magnet is mounted can rotate has the efficiency that is smaller than the rotary electrical machine based on the system in which the inner rotor 4 and the outer rotor 7 are combined so that they rotate together as shown in FIG. 1.

PRIOR TECHNICAL DOCUMENTS

Patent Documents

Patent Document: Patent 1 application 2011-217484 as it is open to the public examination

SUMMARY OF THE INVENTION

The object of the present invention is to provide a rotary electrical machine that provides an advantageously equivalent efficiency over any one of the conventional rotary electrical machines, by reducing the response time from the time when the rotation of the rotating shaft from which the driving force of the motor is extracted causes the coil to be energized so that it can be conducted electrically to the time when the rotating shaft can reach its assumed number of revolutions.

The rotary electrical machine proposed by the present invention includes a first annular body and a second annular body that face opposite each other with a coil interposed therebetween and either of which is provided with a permanent magnet, either or both of said first annular body and said second annular body being capable of rotating about the axis of a rotating shaft in such a way that the driving force of a motor is extracted through said rotating first annular body or said rotating second annular body or through the axis of said rotating shaft rotating with said rotating first annular body or said rotating second annular body, wherein the improvement comprises any one of the structures (1)-(4) described below:

(1) the structure in which said second annular body is arranged rotatably with regard to the axis of said rotating shaft in such a way that the driving force of said motor is extracted through said rotation of said first annular body;

(2) the structure in which said first annular body is arranged rotatably with respect to the axis of said rotating shaft in such a way that the driving force of said motor is extracted through said rotation of said second annular body;

(3) the structure in which said second annular body is arranged rotatably with regard to the axis of said rotating shaft in such a way that the driving force of said motor is extracted through the axis of said rotating shaft rotating with said first annular body that is rotating; and (4) the structure in which said first annular body is arranged rotatably with regard to the axis of said rotating shaft in such a way that the driving force of said motor is extracted through the axis of said rotating shaft rotating with said rotating second annular body that is rotating.

In accordance with the rotary electrical machine proposed by the present invention, the response time from the time when the rotation of the rotating shaft from which the driving force of the motor is extracted causes the coil to be energized so that it can be conducted electrically to the time when the rotating shaft can reach its assumed number of revolutions can be reduced, and the advantageously equivalent efficiency over any one of the conventional rotary electrical machines can be provided.

BEST MODE OF EMBODYING THE INVENTION

Figure 1:
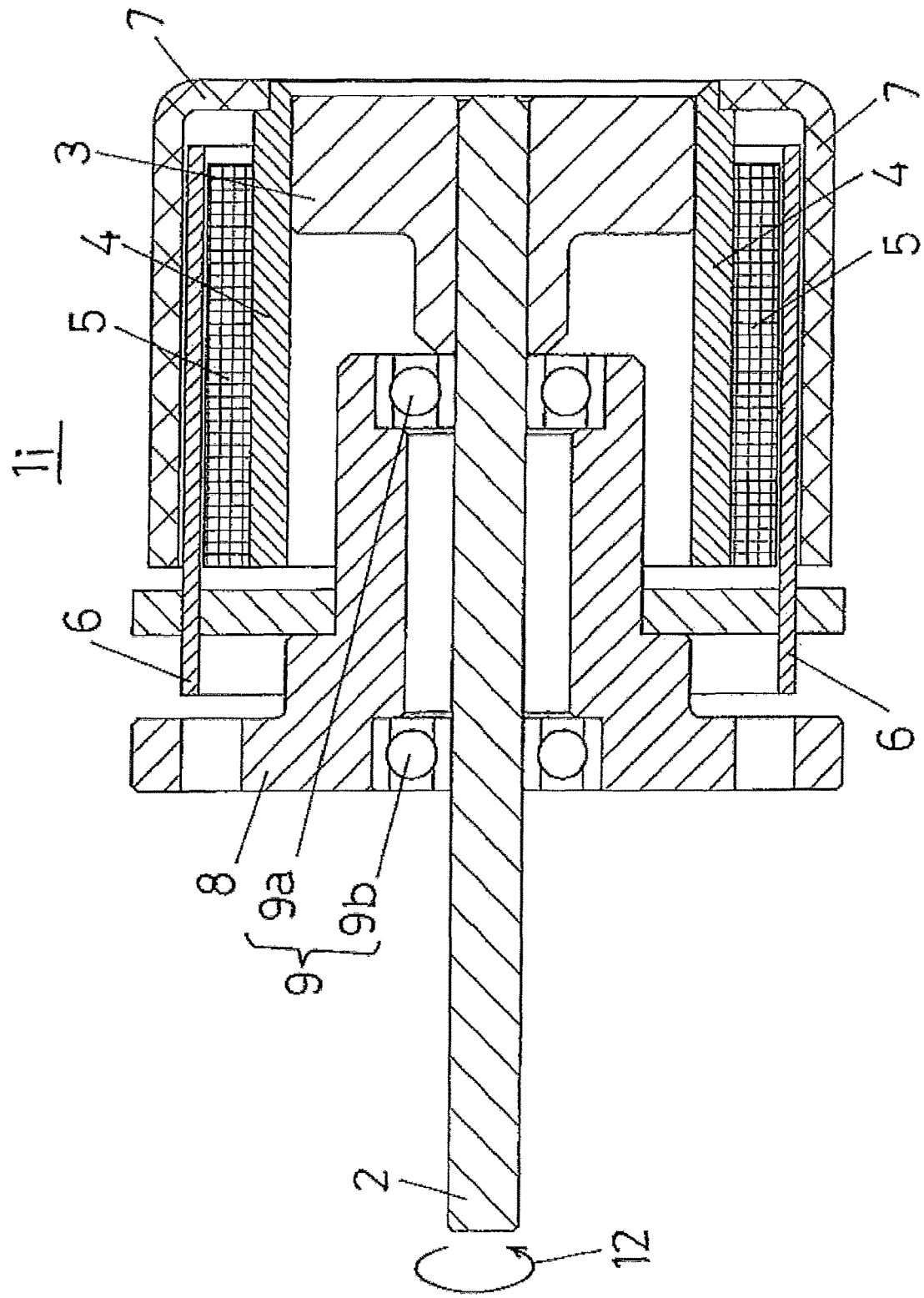
FIG. 1 is a sectional view illustrating one example of the conventional rotary electrical machine although some component parts are omitted.

In the following description, several specific embodiments of the present invention will be presented by referring to FIG. 2 to FIG. 10 of the accompanying drawings.

The rotary electrical machine according to the present invention is based on the system described above, and includes a first annular body and a second annular body that face opposite each other and either of which has a permanent magnet mounted therein, either or both of said first annular body and said second annular body being capable of rotating about the axis of a rotating shaft and the driving force of a motor being extracted through said rotating first annular body or said rotating second annular body or through the axis of said rotating shaft rotating with said rotating first annular body or said rotating second annular body.

The rotary electrical machine of the present invention, which is not inferior to or, in other words, is functionally equivalent to the rotary electrical machine based on the system described above, comprises any one of the structures (1) to (4) described below:

(1) the structure in which said second annular body is arranged rotatably with regard to the axis of said rotating shaft in such a way that the driving force of said motor is extracted through said rotation of said first annular body;

(2) the structure in which said first annular body is arranged rotatably with respect to the axis of said rotating shaft in such a way that the driving force of said motor is extracted through said rotation of said second annular body;

(3) the structure in which said second annular body is arranged rotatably with regard to the axis of said rotating shaft in such a way that the driving force of said motor is extracted through the axis of said rotating shaft rotating with said rotating first annular body; and (4) the structure in which said first annular body is arranged rotatably with regard to the axis of said rotating shaft in such a way that the driving force of said motor is extracted through the axis of said rotating shaft rotating with said rotating second annular body.

This permits the rotary electrical machine of the present invention to provide the response property (time) that is better than that of the rotary electrical machine based on the system in which the inner rotor and the outer rotor rotate together. More specifically, the rotary electrical machine of the present invention can provide the response property (time) that has been improved over the conventional rotary electrical machine based on the system in which the outer rotor is fixed and is therefore non-rotational and only the inner rotor on which the permanent magnet is mounted is rotational.

In addition, the rotary electrical machine of the present invention can provide the efficiency that is not inferior to or, in other words, is functionally equivalent to that of the conventional rotary electrical machine based on the system in which the inner rotor and the outer rotor can rotate together, although this conventional rotary electrical machine may provide the efficiency that is improved over the conventional rotary electrical machine based on the system in which the outer rotor is fixed and is therefore non-rotational and only the inner rotor on which the permanent magnet is mounted is rotational.

Embodiment 1

Figure 2:
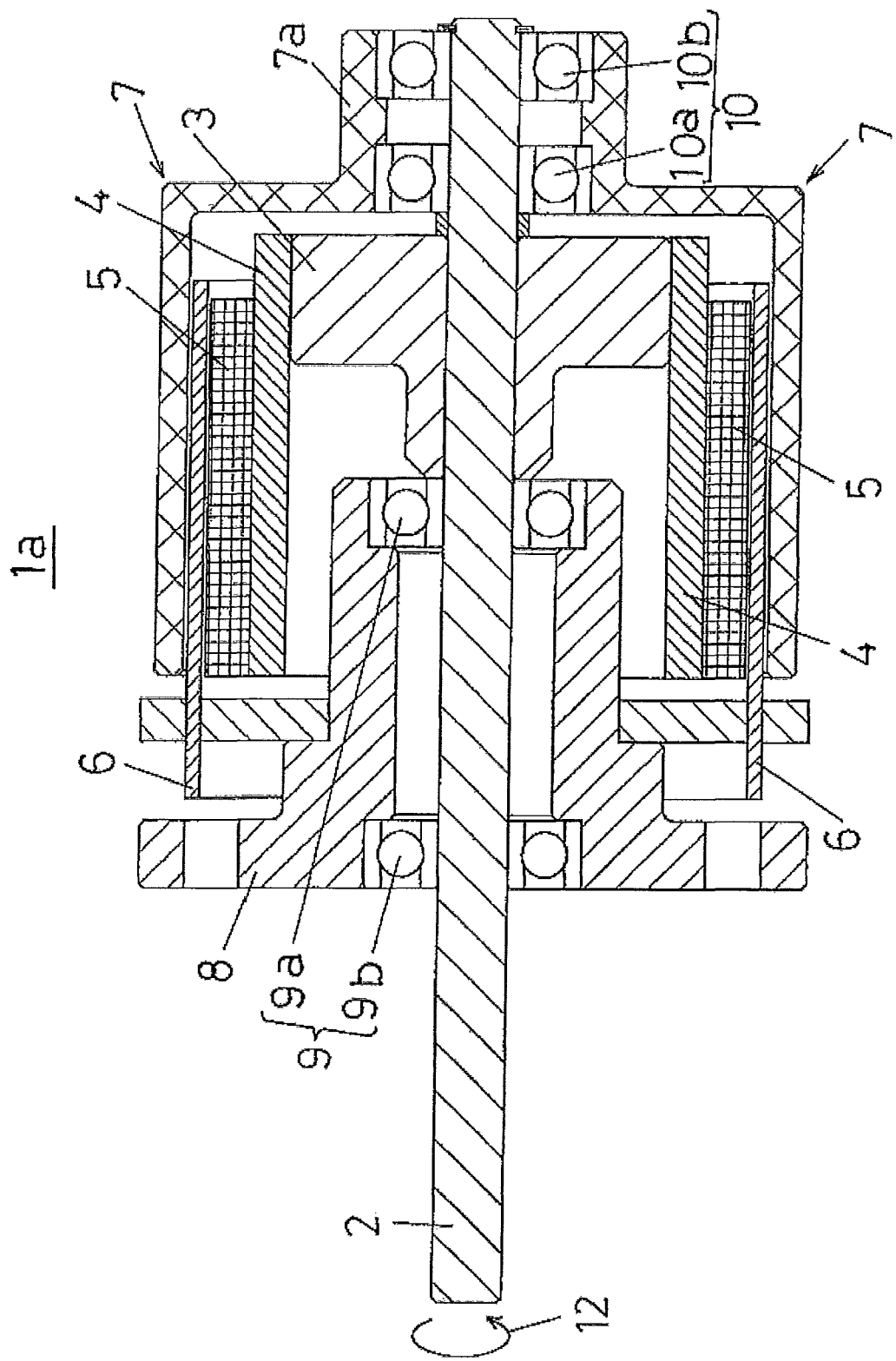
FIG. 2 is a sectional view illustrating the rotary electrical machine in accordance with the embodiment 1 of the present invention although some component parts are omitted.

FIG. 2 is a sectional view illustrating one embodiment 1 of the present invention although some component parts are omitted.

The axis of the rotating shaft 2 that acts as the rotating shaft is supported rotatably by means of a bearing assembly 9 within a housing 8. In the embodiment shown, the bearing assembly 9 includes a bearing unit 9a and a bearing unit 9b which are spaced away from each other at a predetermined interval in the axial direction of the axis of the rotating shaft 2. The bearing assembly 9 may include a single bearing unit such as the bearing unit 9a or the bearing unit 9b.

The inner rotor 4 or specifically the first annular body is supported concentrically on the axis of the rotating shaft 2. In the embodiment shown, the inner rotor 4 is mounted on the axis of the rotating shaft by means of a hub 3.

Outside the inner rotor 4 in the radial direction of the axis of the rotating shaft 2, the outer rotor 7 or specifically the second annular body is mounted concentrically on the axis of the rotating shaft 2

Between the inner rotor 4 and the outer rotor 7, a coil 6 is mounted concentrically on the axis of the rotating shaft 2. In the embodiment shown, the coil 6 has the annular shape and is supported within the housing 8.

Either of the inner rotor 4 and the outer rotor 7 may have a permanent magnet 5 mounted on the circumferential side thereof facing opposite the other corresponding inner rotor 4 or outer rotor 7. In the embodiment shown, the permanent magnet 5 is mounted on the outer circumference of the inner rotor 4 facing opposite the inner circumference of the outer rotor 7.

In this way, a magnetic field is developed between the inner rotor 4 and the outer rotor 7.

On one end of the axis of the rotating shaft 2 (the right side end in FIG. 2), the outer rotor 7 is supported rotatably on the axis of the rotating shaft 2 by way of a bearing assembly 10. In the embodiment shown, this permits the inner rotor 4 or the outer rotor 7 on which the permanent magnet 5 is not mounted to be supported rotatably on the axis of the rotating shaft 2.

In the embodiment shown, the inner rotor 4 may be provided to correspond to the first annular body and the outer rotor 7 may be provided to correspond to the second annular body, for example.

In the embodiment shown, the bearing assembly 10 includes a bearing unit 10a and a bearing unit 10b that are spaced away from each other at a predetermined interval in the axial direction of the axis of the rotating shaft 2. The bearing assembly 10 may include a single bearing unit such as the bearing unit 10a or the bearing unit 10b.

On the right side of the outer rotor 8 in FIG. 1, the axis of the rotating shaft 2 extends in the axial direction thereof on which a supporting portion 7a extending in the right direction in FIG. 2 is formed. By means of the bearing unit 10a and the bearing unit 10b that are mounted within the supporting portion 7a, the outer rotor 7 is supported rotatably on the axis of the rotating shaft 2.

When the coil 6 is energized so that it can be conducted electrically, it produces the electromagnetic field in the magnetic field developed between the inner rotor 4 and the outer rotor 7, which causes the permanent magnet to be rotated in the direction of an arrow 12, for example.

As the permanent magnet 5 is rotated, it also causes the inner rotor 4, the hub 3 and the axis of the rotating shaft 2 to rotate accordingly in the direction of the arrow 12.

While the inner rotor 4 and the axis of the rotating shaft 2 are rotating, however, the outer rotor 7 that is located outside the axis of the rotating shaft 2 in the radial direction thereof will never rotate together. This is because the outer rotor 7 is supported rotatably on the axis of the rotating shaft 2 by means of the bearing assembly 10.

Because the outer rotor 7 will never rotate with the axis of the rotating shaft 2 while it is rotating, the rotary electrical machine in accordance with the embodiment 1 can reduce the inertial action as compared with the conventional rotary electrical machine shown in FIG. 1 and based on the system in which the outer rotor 7 rotates with the inner rotor 4.

In the embodiment shown, this can reduce the response time from the time when the coil 6 is energized so that it can be conducted electrically to the time when the axis of the rotating shaft 2 can reach its assumed number of revolutions as compared with the conventional rotary electrical machine 1g shown in FIG. 1 and based on the system in which the inner yoke and the outer yoke rotate together.

Figure 15:
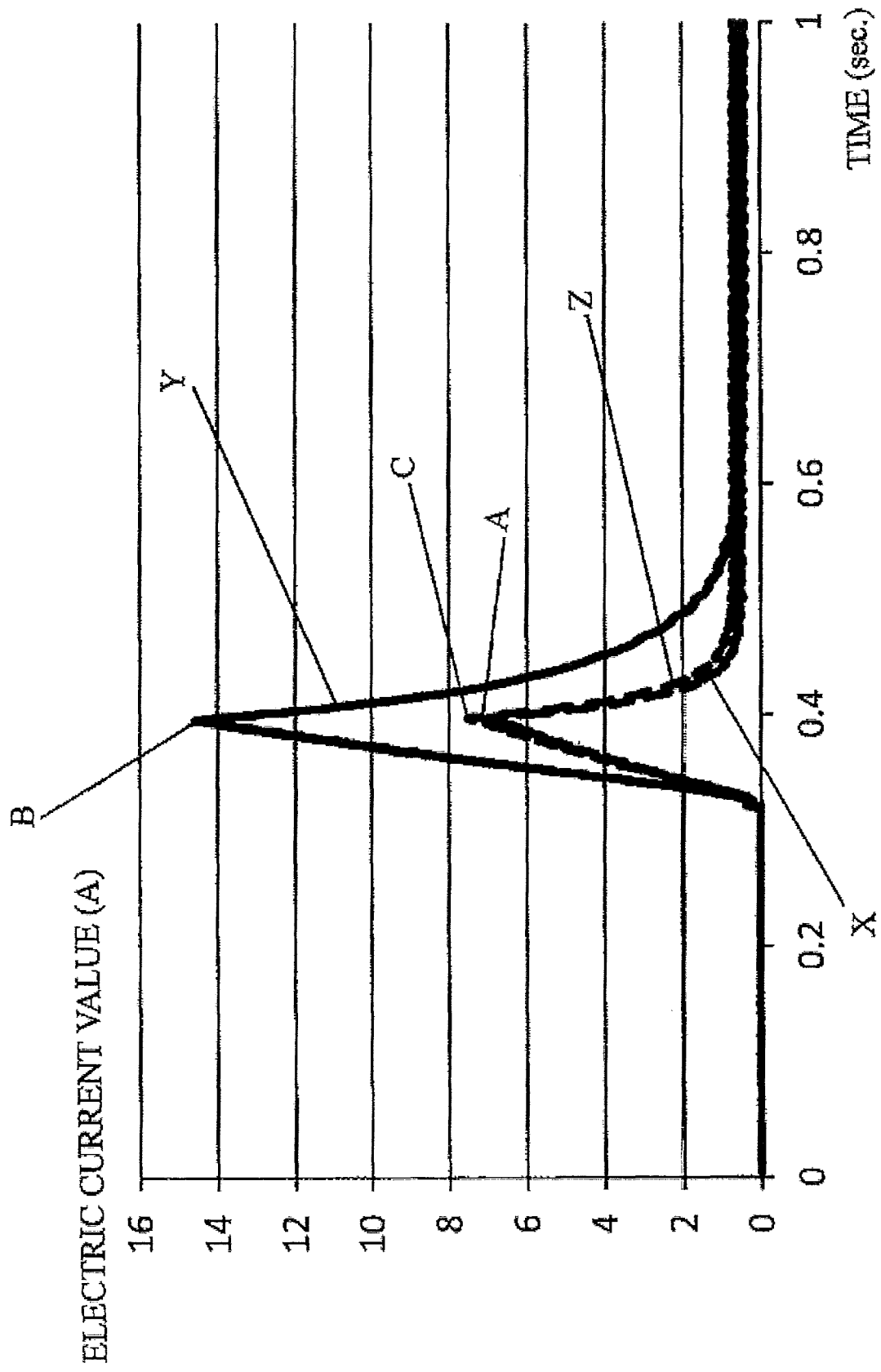
FIG. 15 is a graph diagram that presents the relationships between the electrical current value and the time after the coil has been energized so that it can be conducted electrically for the rotary electrical machine of the present invention and for the conventional rotary electrical machine of the prior art.

FIG. 15 is a graph diagram that presents the relationships between the electric current value and the time after the coil has been conducted electrically for the rotary electrical machine of the present invention and for the conventional rotary electrical machine, both of which were examined under the same conditions such as the same dimensions. The y-axis presents the current value and the x-axis presents the time after the coil has been conducted electrically. The current value and the time are represented by the respective values that are multiplied by a particular factor so that the relationships between the current value and the time after the coil is energized so that it can be conducted electrically can be identified more clearly.

The result obtained by examining the rotary electrical machine 1a according to the embodiment 1 is identified by Z, the result obtained by examining the conventional rotary electrical machine 1g shown in FIG. 1 is identified by Y, and the result obtained by examining the conventional rotary electrical machine 1i having the structure shown in FIG. 1 and based on the system in which the outer yoke that corresponds to the outer rotor is fixed and is therefore non-rotational is identified by X.

For the conventional rotary electrical machine based on the system in which the outer yoke is fixed and is therefore non-rotational, it is found that the current value is rising up to the point A after the coil is energized so that it can be conducted electrically. For the conventional rotary electrical machine 1*i* shown in FIG. 1 and based on the system in which the inner yoke and the outer yoke rotate together, it is found that the current value is rising up to the point B after the coil is energized so that it can be conducted electrically. For the rotary electrical machine 1*a* according to the embodiment 1, it is found that the current value is rising up to the point C after the coil is energized so that it can be conducted electrically.

If the electric current convergence from the time when the maximum current value is reached to the time when the constant rotation state is reached after the coil is energized so that it can be conducted electrically occurs earlier, the response time will be reduced accordingly. It is found that the response time for the conventional rotary electrical machine shown in FIG. 1 and based on the system in which the inner yoke and the outer yoke rotate together is slower than that for the conventional rotary electrical machine based on the system in which the outer yoke is fixed and is therefore non-rotational. It is also found, however, that the response time for the rotary electrical machine 1*a* in accordance with the embodiment 1 of the present invention is not inferior to or, in other words, is functionally equivalent to that for the conventional rotary electrical machine based on the system in which the outer yoke is fixed and is therefore non-rotational.

Figure 16:
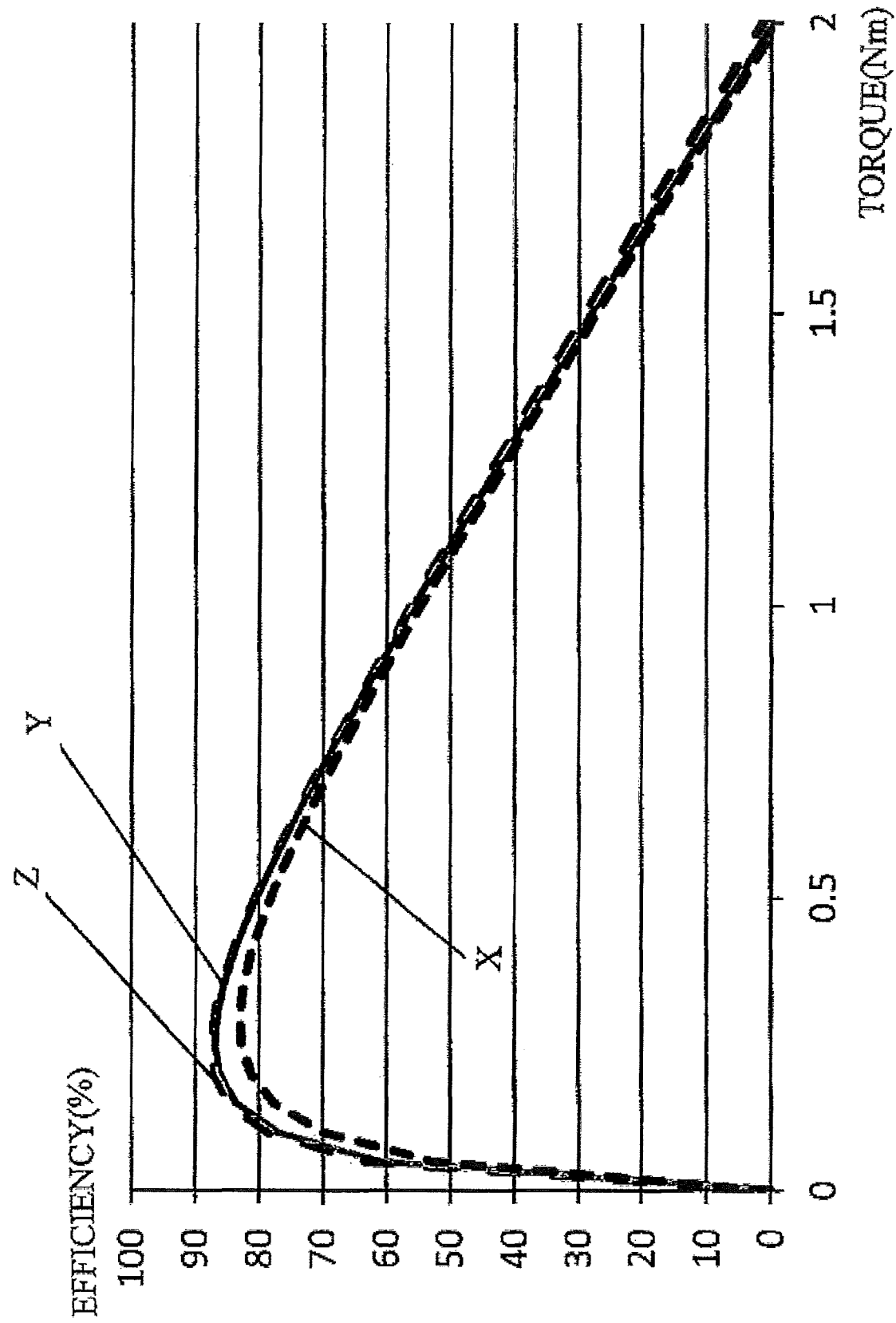
FIG. 16 is a graph diagram that presents the efficiency curves obtained under the same conditions for the three types of the rotary electrical machine for which the respective response times have been studied.

FIG. 16 is a graph diagram that presents the efficiency curves obtained by examining the respective response times under the same conditions for the three types of the rotary electrical machine for which the results obtained by examining the relationships between the current value and the time are presented in FIG. 15.

It is found that the efficiency for the rotary electrical machine in accordance with the embodiment 1 of the present invention as identified by the symbol Z is not inferior to or, in other words, is functionally equivalent to that for the conventional rotary electrical machine 1*i* shown in FIG. 1 and based on the system in which the inner yoke and the outer yoke rotated together as identified by the symbol Y. It is also found that each of those rotary electrical machines provides the efficiency that is better than that for the rotary electrical machine based on the system in which the outer yoke is fixed and is therefore non-rotational as identified by the symbol X.

From the results presented in FIG. 15 and FIG. 16, it is confirmed that the rotary electrical machine in accordance with the embodiment 1 of the present invention has the characteristics to be described below.

It is found that the response time for the rotary electrical machine 1*a* in accordance with the embodiment 1 of the present invention has been improved over the conventional rotary electrical machine 1*i* shown in FIG. 1 and based on the system in which the inner yoke and the outer yoke rotate together, and is not inferior to or, in other words, is functionally equivalent to that for the rotary electrical machine based on the system in which the outer yoke is fixed and is therefore non-rotational.

It is also found that the efficiency for the rotary electrical machine 1*a* in accordance with the embodiment 1 of the present invention has been improved over the conventional rotary electrical machine based on the system in which the outer yoke rotate is fixed and is therefore non-rotational, and is not inferior to or, in other words, is functionally equivalent to that for the rotary electrical machine 1*i* shown in FIG. 1 and based on the system in which the inner yoke and the outer yoke rotate together.

As one example of its application, the rotary electrical machine shown in FIG. 2 may be used as the servomotor that provides the improved response time.

Embodiment 2

Figure 3:
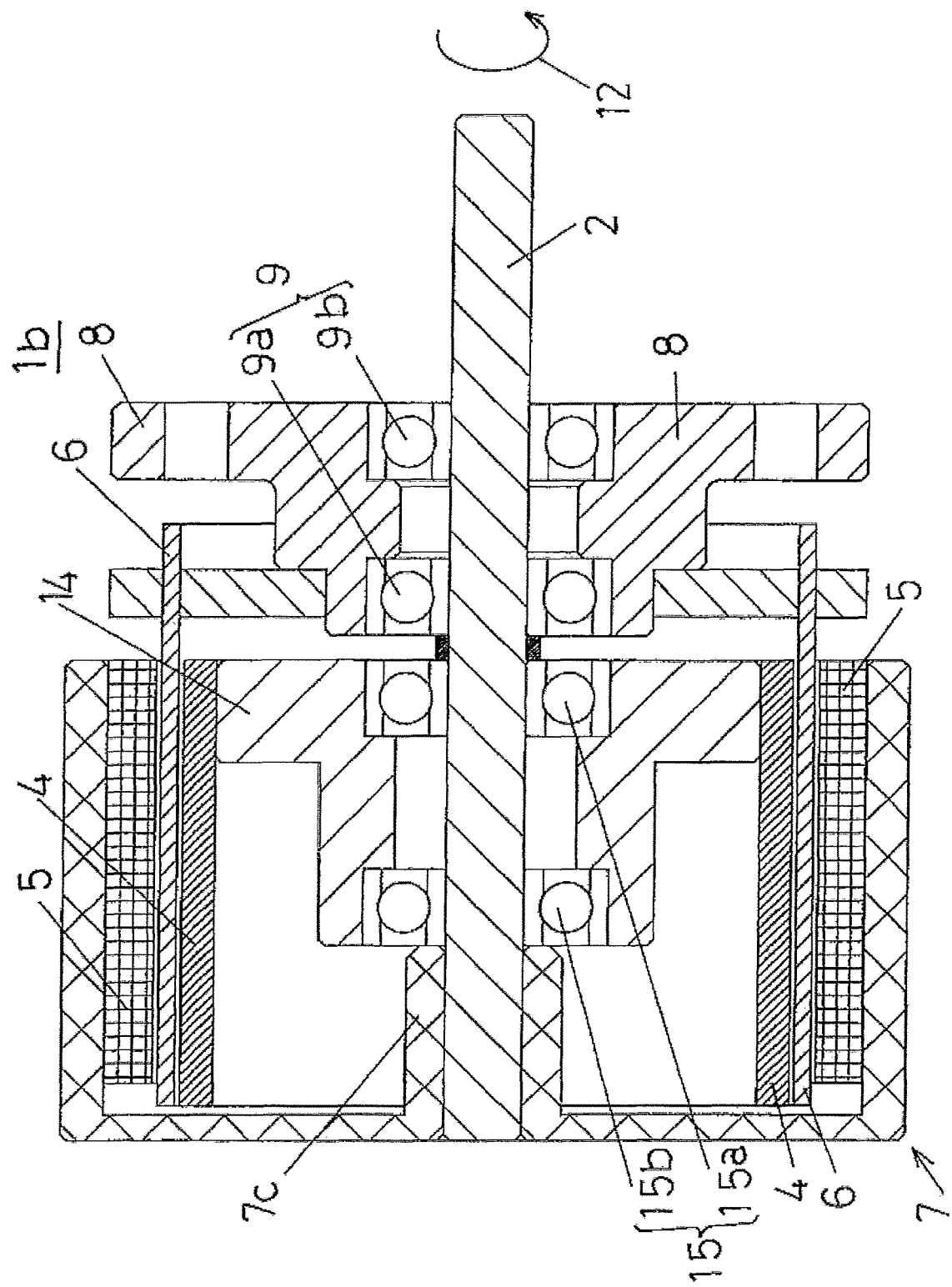
FIG. 3 is a sectional view illustrating the rotary electrical machine in accordance with the embodiment 2 of the present invention.

The embodiment 2 of the present invention is now described by referring to FIG. 3.

FIG. 3 is a sectional view illustrating one example of the rotary electrical machine 1*b* in accordance with the embodiment 2 of the present invention although some component parts are omitted. The component parts which are common to those in the structure of the rotary electrical machine that has been described in the embodiment 1 are given like reference numerals. Those component parts will not be described below specifically.

In the embodiment 2. the inner rotor 4 or specifically the first annular body is supported rotatably on the axis of the rotating shaft 2 by means of a hub 14 and a bearing assembly 15 while the outer rotor 7 or specifically the second annular body is supported on the axis of the rotating shaft 2 so that it can rotate with the axis of the rotating shaft 2.

A permanent magnet is mounted on the inner circumference of the outer rotor 7 facing opposite the outer circumference of the inner rotor 4.

In this embodiment, the inner rotor 4 is provided to correspond to the first annular body and the outer rotor 7 is provided to correspond to the second annular body, for example.

Similarly to the preceding embodiment 1, the bearing assembly 15 also includes a bearing unit 15*a* and a bearing unit 15*b* that are spaced away from each other at a predetermined interval in the axial direction of the axis of the rotating shaft 2. The bearing assembly 15 may include a single bearing unit such as the bearing unit 15*a* or the bearing unit 15*b*.

When a coil 6 is energized so that it can be conducted electrically, it causes an electromagnetic field to be developed in the magnetic field formed between the inner rotor 4 and the outer rotor 7. The permanent magnet 5 is then rotated under the action of the developed electromagnetic force, rotating in the direction of an arrow 12, for example.

As the permanent magnet 5 is thus rotated, it also causes the outer rotor 7 and the axis of the rotating shaft 2 to rotate in the direction of the arrow 12.

It should be noted, however, that the inner rotor 4 that is located outside the axis of the rotating shaft 2 in the radial direction thereof will never rotate with the outer rotor 7 and the axis of the rotating shaft 2 even when they are rotating. This is because the inner rotor 4 is supported rotatably on the axis of the rotating shaft 2 by way of the bearing assembly 15.

As described above, the inner rotor 4 will never rotate with the axis of the rotating shaft 2 even when it is rotating. While the rotating body from which the driving force of the motor is extracted is rotating, therefore, the rotary electrical machine in accordance with this embodiment can provide a reduced inertial action as compared with the conventional rotary electrical machine based on the system in which the inner rotor and the outer rotor rotate together.

As such, the response time from the time when the coil is energized so that it can be conducted electrically to the time when the axis of the rotating shaft 2 can reach its assumed number of revolutions can be improved over the conventional rotary electrical machine.

As one example of its application, the rotary electrical machine 1b may also be used as the servomotor that provides the improved response time.

Embodiment 3

Figure 4:
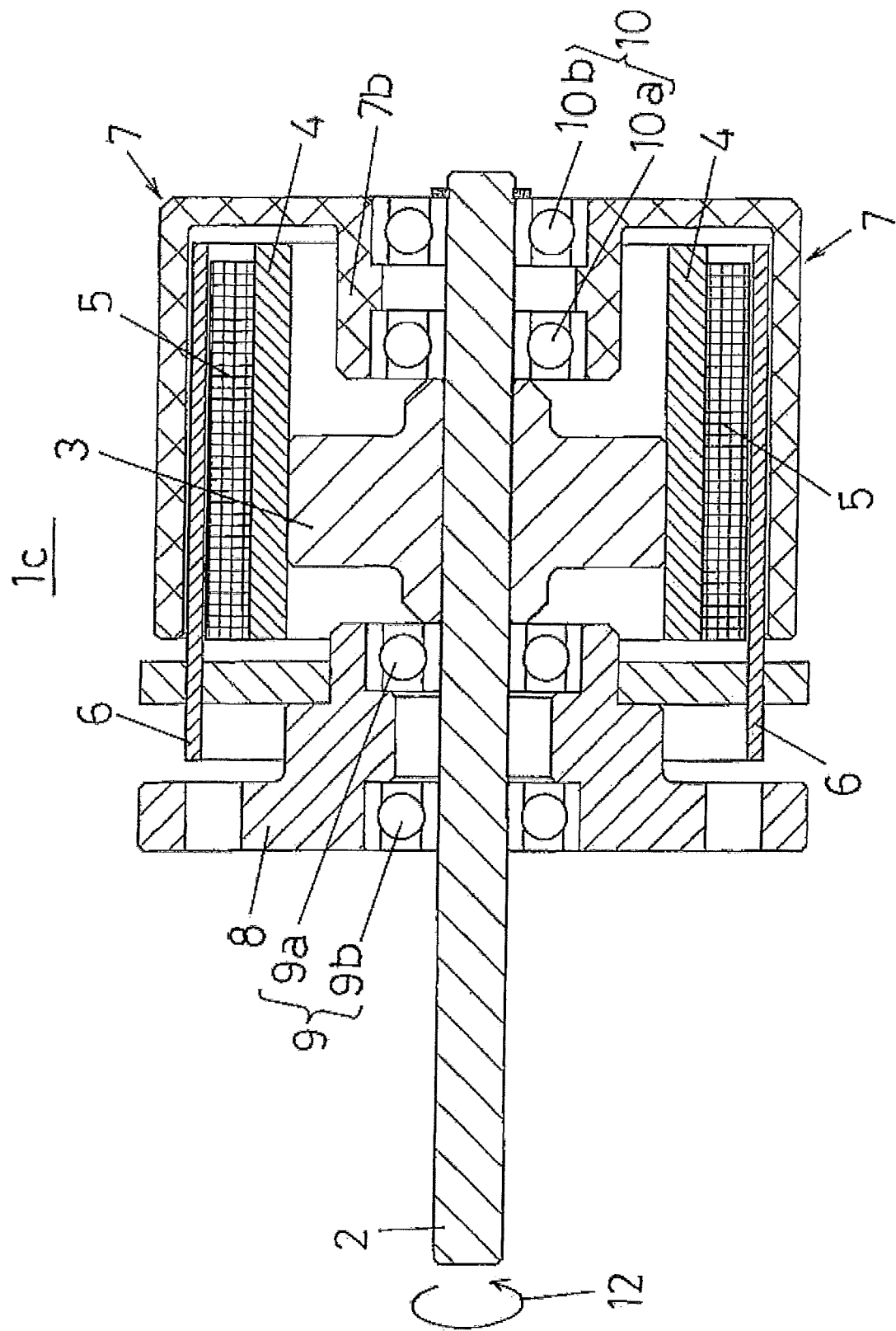
FIG. 4 is a sectional view illustrating the rotary electrical machine in accordance with the embodiment 3 of the present invention although some component parts are omitted.

The embodiment 3 of the present invention is now described by referring to FIG. 4.

FIG. 4 is a sectional view illustrating one example of the rotary electrical machine 1c in accordance with the embodiment 3 of the present invention although some component parts are omitted. The component parts which are common to those in the structure of the rotary electrical machine that has been described in the embodiment 1 are given like reference numerals. Those component parts will not be described below specifically.

In the embodiment 3, the bearing assembly 10 that supports rotatably the outer rotor 7 with regard the axis of the rotating shaft 2 as described in the embodiment 1 is provided so that it is located inside the inner rotor 4 in the radial direction of the axis of the rotating shaft 2.

More specifically, the rotary electrical machine 1c shown in FIG. 3 is different from the rotary electrical machine shown in FIG. 2 in that the bearing assembly 10 is located inside the inner rotor 4 in the radial direction of the axis of the rotating shaft 2.

As shown in FIG. 4, a supporting portion 7b is formed on the right side of the outer rotor 7 so that it is extended on the left side in the axial direction of the axis of the rotating shaft 2. The outer rotor 7 is supported rotatably on the axis of the rotating shaft 2 by means of the bearing unit 10a and the bearing unit 10b mounted within the supporting portion 7b.

In this embodiment, the inner rotor 4 is provided so that it corresponds to the first annular body and the outer rotor 7 is provided so that it corresponds to the second annular body.

It should be noted that in this embodiment, the bearing assembly 10 may also include a single bearing unit such as the bearing unit 10a or the bearing unit 10b.

Similarly to the preceding embodiments, the rotary electrical machine 1c in accordance with the embodiment shown in FIG. 4 is provided so that the outer rotor 7 located outside the rotating shaft 2 in the radial direction thereof will never rotate with the axis of the rotating shaft 2 while it is rotating.

As such, the rotary electrical machine in accordance with the embodiment 4 can provide a reduced inertial action as compared with the conventional rotary electrical machine shown in FIG. 1 and based on the system in which the outer rotor 7 rotates with the axis of the rotating shaft 2 while it is rotating. The response time from the time when the coil 6 is energized so that it can be conducted electrically to the time when the rotating shaft 2 can reach its assumed number of revolutions can thus become faster than the response time for the conventional rotary electrical machine shown in FIG. 1.

As it may be seen from the rotary electrical machine 1e in accordance with the embodiment shown in FIG. 4, the baring assembly 10 that supports rotatably the outer rotor 7 with regard to the axis of the rotating shaft 2 is located inside the inner rotor 4 in the radial direction thereof. By employing such structure, the length of the rotating shaft 2 in the axial direction thereof can be reduced as compared with the rotary electrical machine 1a shown in FIG. 2.

In this respect, the present invention is advantageous in that it can provide a smaller-size rotary electrical machine.

Like the preceding embodiments and as one example of its application, the rotary electrical machine 1c shown in FIG. 4 may also be used as the servomotor that provide the improved response time.

Embodiment 4

Figure 5:
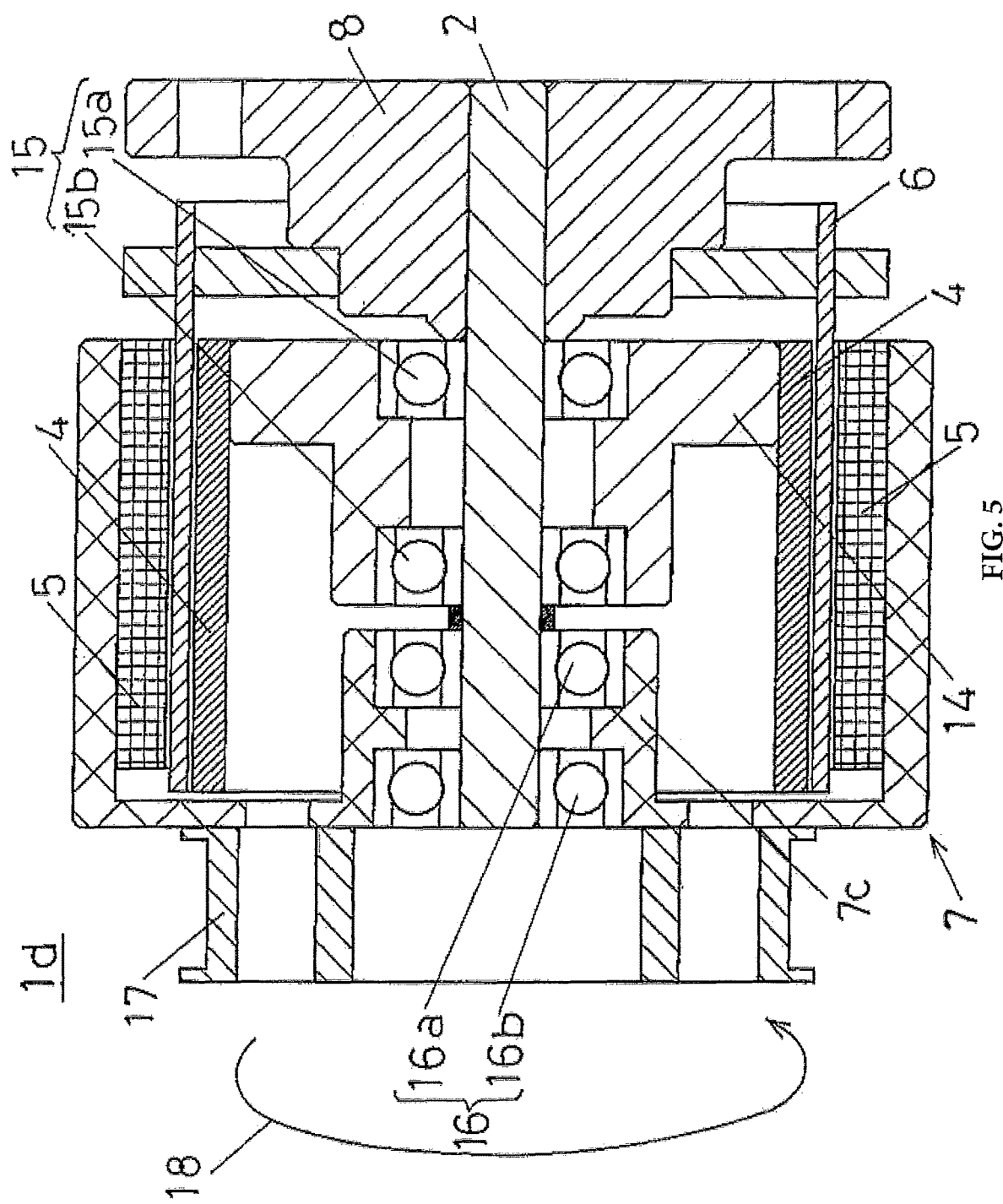
FIG. 5 is a sectional view illustrating the rotary electrical machine in accordance with the embodiment 4 of the present invention although some component parts are omitted.

The embodiment 4 of the present invention is now described by referring to FIG. 5.

FIG. 5 is a sectional view illustrating one example of the rotary electrical machine 1d in accordance with the embodiment 4 of the present invention although some component parts are omitted. The component parts that are common to those in the structures of the rotary electrical machines 1a-1c described in the preceding embodiments 1 to 3 are given like reference numerals. Those component parts will not be described below specifically.

Each of the preceding embodiments 1 to 3 is provided so that the driving force of the motor can be extracted from the axis of the rotating shaft 2. On the contrary, the current embodiment 4 is provided so that the driving force of the motor can be extracted from the outer rotor 7 or specifically the second annular body. The rotary electrical machine in the embodiment 4 is based on the so-called direct driving system.

The axis of the rotating shaft 2 is supported within the housing 8.

The inner rotor 7 or specifically the first annular body is supported rotatably so that the inner rotor 7 and the outer rotor or specifically the second annular body can rotate together with regard to the axis of the rotating shaft 2.

The inner rotor 4 is supported rotatably on the axis of the rotating shaft 2 by means of the hub 14 and the bearing assembly 15. The bearing assembly 15 includes a bearing unit 15a and a bearing unit 15b that are spaced away from each other in the axial direction of the axis of the rotating shaft 2.

As shown in FIG. 5, a supporting portion 7c is formed on the left side of the outer rotor 7 so that it is extended on the right side in the axial direction of the axis of the rotating shaft 2. The outer rotor 7 is supported rotatably on the axis of the rotating shaft 2 by means of the bearing unit 16a and the bearing unit 1bb mounted within the supporting portion 7c.

Between the inner rotor 4 and the outer rotor 7, the coil 6 is mounted concentrically on the axis of the rotating shaft 2 in such a way that it is supported within the housing 8.

A permanent magnet 5 is mounted on the inner circumference of the outer rotor 7 that faces opposite the outer circumference of the inner rotor 4 so that a magnetic field can be formed between the inner rotor 4 and the outer rotor 4.

As one example of this embodiment, the inner rotor 4 is provided so that it corresponds to the first annular body and the outer rotor 7 is provided so that it corresponds to the second annular body.

When the coil 6 is energized so that it can be conducted electrically, it causes an electromagnetic force to be developed in the magnetic field formed between the inner rotor 4 and the outer rotor 7. The permanent magnet 5 is then subjected to the action of the developed electromagnetic force so that it can be rotated in the direction of an arrow 18, for example.

As the permanent magnet 5 is rotated, it also causes the outer rotor 7 to rotate in the direction of the arrow 18. The power for driving the motor may be obtained through the combination of a belt (not shown) and a pulley 17 on the outer rotor 7.

When the outer rotor 7 is rotated in the direction of the arrow 18, it will never cause the inner rotor 4 to rotate with the outer rotor 7. This is because the outer rotor 7 as well as the inner rotor 4 is supported rotatably on the axis of the rotating shaft 2.

Because the inner rotor 4 will never rotate with the outer rotor 7 when the outer rotor 7 is rotated, the rotary electrical machine offered by this embodiment can provide the smaller inertial action as compared with the conventional rotary electrical machine shown in FIG. 1 and based on the system in which the outer rotor 7 and the inner rotor 4 rotate together.

According to the current embodiment, the response time from the time when the coil 6 is energized so that it can be conducted electrically to the time when the outer rotor 7 from which the driving force of the motor is extracted can reach its assumed number of revolutions can thus be faster than the response time for the conventional rotary electrical machine shown in FIG. 1.

As one example of its application, the rotary electrical machine 1d shown in FIG. 5 may also be used as the servomotor that provides the improved response property (time).

Embodiment 5

Figure 6:
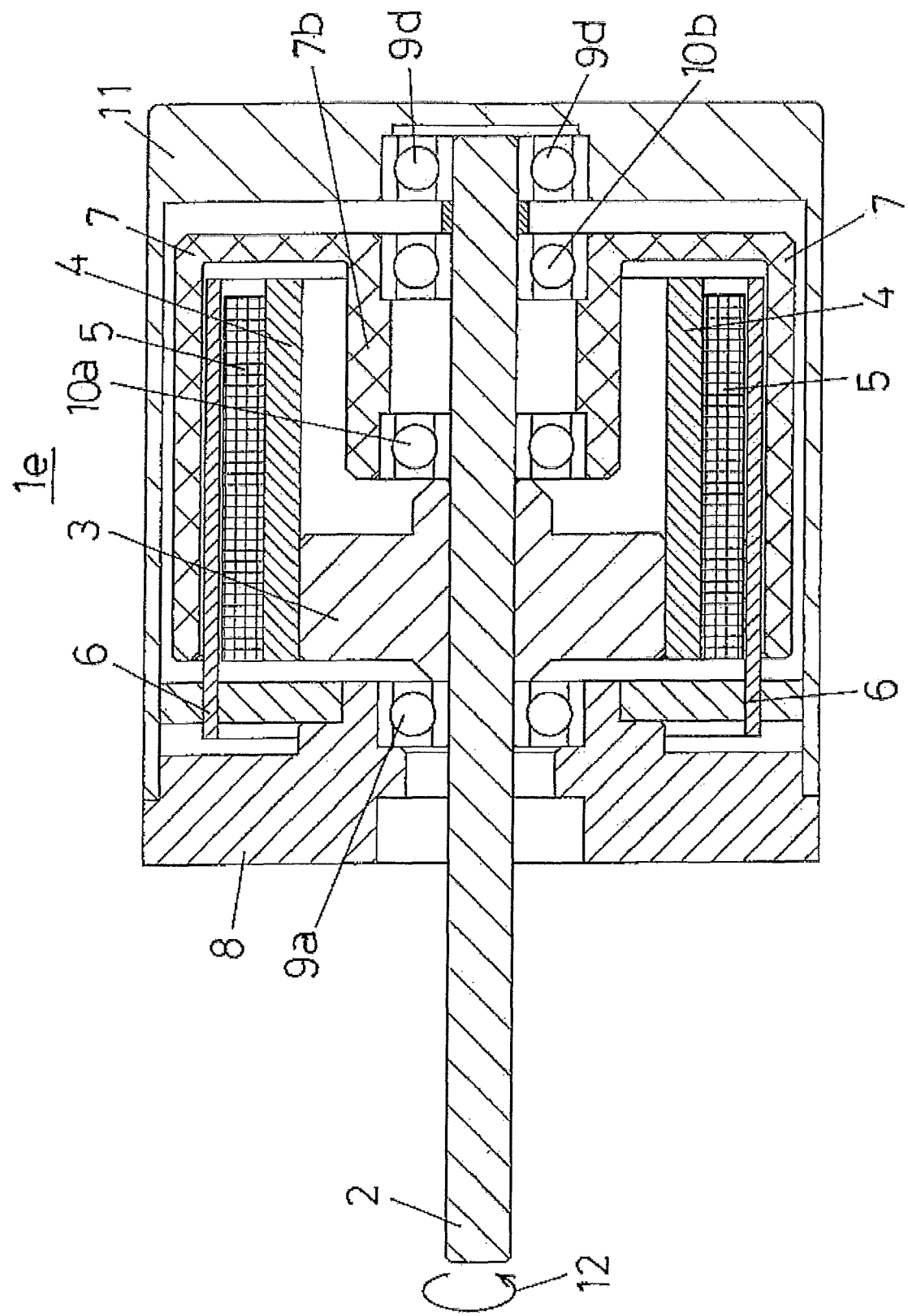
FIG. 6 is a sectional view illustrating the rotary electrical machine in accordance with the embodiment 5 of the present invention although some component parts are omitted.

The embodiment 5 of the present invention is now described by referring to FIG. 6.

FIG. 16 is a sectional view illustrating one example of the rotary electrical machine 1e in accordance with the embodiment 5 of the present invention although some component parts are omitted. The component parts which are common to those in each of the structures for the rotary electrical machines 1a to 1d described in the corresponding embodiments 1 to 4 are given like reference numerals. Those component parts will not be described below specifically.

The rotary electrical machine 1e further includes a protective cover 11 for covering, from the outside of the axis of the rotating shaft 2 in the radial direction thereof, the outer rotor 7 whose housing 8 is located outside the axis of the rotating shaft in the radial direction thereof. In this respect, the rotary electrical machine 1e differs from the rotary electrical machines 1a to 1d described in the corresponding embodiments 1 to 4.

In the embodiment shown, the protective cover 11 is provided for covering the housing 8 on the right side of the axis of the rotating shaft 2 in FIG. 6 and is fixed to the housing 8 by being mounted on the housing 8.

The axis of the rotating shaft 2 is supported rotatably on the protective cover 11 by means of a bearing unit 9d on one side of the axis of the rotating shaft 2 (that is, the right side of the axis of the rotating shaft 2 in FIG. 6).

In the rotary electrical machine 1e in accordance with the embodiment shown in FIG. 6, the outer rotor 7 located outside the axis of the rotating shaft 2 in the radial direction thereof will never rotate with the axis of the rotating shaft 2 while it is rotating. Furthermore, the protective cover 11 will never rotate with the axis of the rotating shaft 2 while it is rotating because the protective cover 11 is supported on the axis of the rotating shaft 2 by means of the bearing unit 9d.

Similarly to the preceding embodiments, the current embodiment 5 can also offer the rotary electrical machine that provides the smaller inertial action as compared with the conventional rotary electrical machine shown in FIG. 1. In this way, the response time from the time when the coil 6 is energized so that it can be conducted electrically to the time when the axis of the rotating shaft 2 can reach its assumed number of revolutions can be faster than that for the rotary electrical machine shown in FIG. 1.

In the rotary electrical machine 1e according to the embodiment 5, it is noted that the axis of the rotating shaft 2 is supported rotatably on the housing 8 by means of the bearing unit 9a. It is also noted that on the right side of the axis of the rotating shaft 2 in the axial direction thereof in FIG. 6 and which is far from the position where the bearing unit 9a is located, the axis of the rotating shaft 2 is supported on the protective cover 11 fixed to the housing 8 by means of the bearing unit 9d.

Thus, the length of the axis of the rotating shaft 2 between the bearing unit 9a and the bearing unit 9d in the axial direction of the axis of the rotating shaft 2 can be greater than the corresponding length of the axis of the rotating shaft 2 between the bearing unit 9a and the bearing unit 9b in each of the embodiments 1 to 3.

This permits the axis of the rotating shaft 2 to rotate in the more stable manner.

The protective cover 11 fixed to the housing 8 can prevent any foreign matter from being attached to the inner rotor 4, the permanent magnet 5, the coil 6 and the outer rotor 7.

The rotary electrical machine in accordance with each of the embodiments 1 to 4 described above may also have the structure in which it further includes the protective cover 11 fixed to the housing 8 and provided for covering, from the outside of the axis of the rotating shaft 2 in the radial direction thereof, the outer rotor 7 located outside the axis of the rotating shaft 2 in the radial direction thereof. This structure can also effectively prevent any foreign matter from entering the rotary electrical machine As one example of its application, the rotary electrical machine 1e shown in FIG. 6 may also be used as the servomotor that provides the improved response property (time).

Each of the embodiments 1 to 3 and 5 is provided so that the driving force of the motor can be extracted from the axis of the rotating shaft 2 while it is rotating. The embodiment 4 provides the rotary electrical machine based on the so-called direct-drive system in which the driving force of the motor can be extracted from the outer rotor 7 or specifically the second annular body.

When the driving force of the motor is extracted in any of the systems described above, either of the inner rotor 4 or specifically the first annular body and the outer rotor 7 or specifically the second annular body will never rotate with the rotating body from which the driving force is extracted while it is rotating. Thus, the rotary electrical machine in accordance with the present invention provides the reduced inertial action as compared with the conventional rotary electrical machine shown in FIG. 1 and based on the system in which both the inner rotor 4 and the outer rotor 7 will rotate together while the rotating body from which the driving force is extracted is rotating.

It may be appreciated from the above description that the response time from the time when the coil 6 is energized so that it can be conducted electrically to the time when the rotating body from which driving force is extracted can reach its assumed number of rotations that is provided by the rotary electrical machine in accordance with each of the embodiments 1 to 5 can be faster than the response time for the conventional rotary electrical machine shown in FIG. 1.

Embodiment 6

Figure 7:
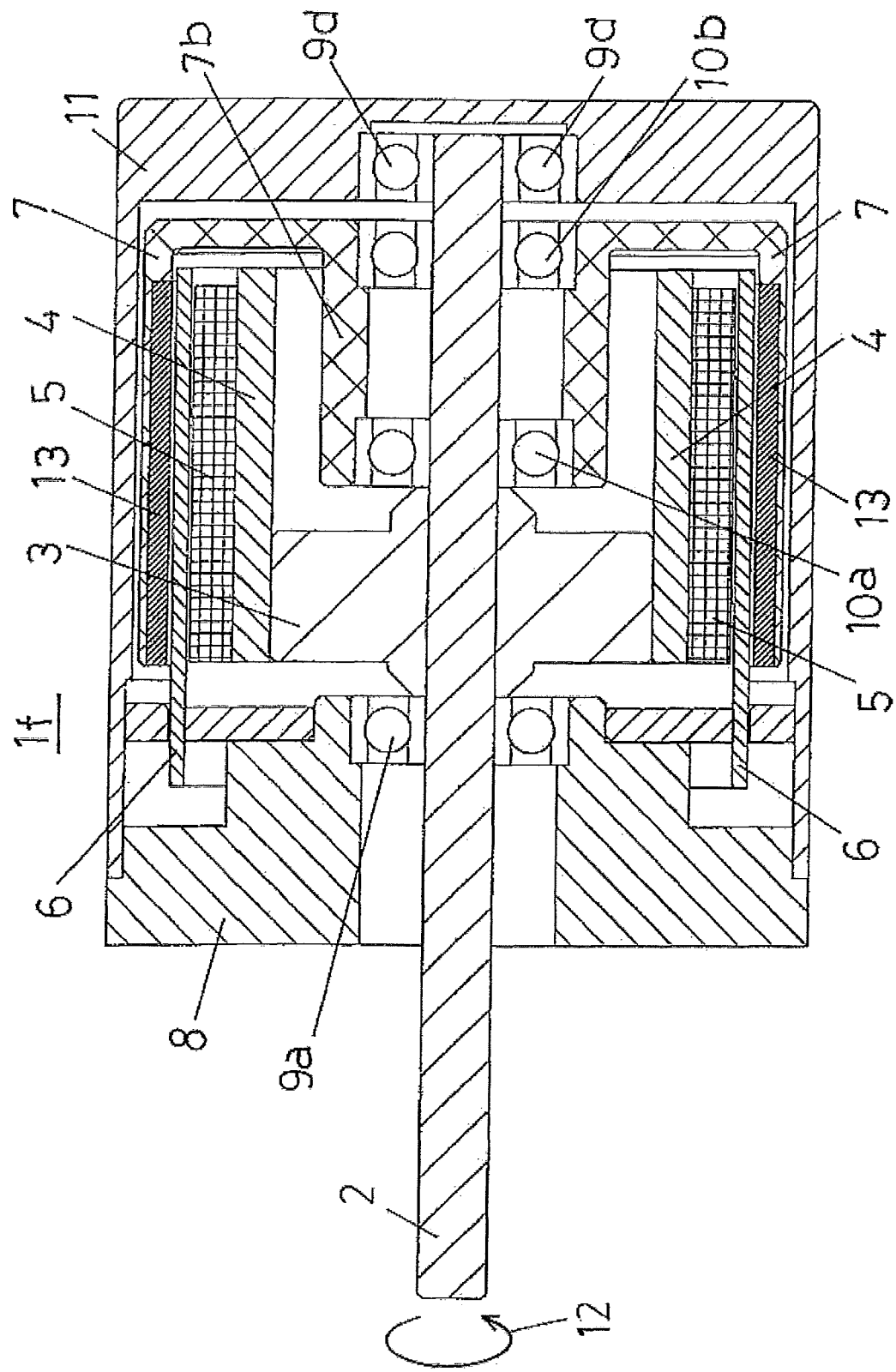
FIG. 7 is a sectional view illustrating the rotary electrical machine in accordance with the embodiment 6 of the present invention although some component parts are omitted.

The embodiment 6 of the present invention is now described by referring to FIG. 7.

FIG. 7 is a sectional view illustrating one example of the rotary electrical machine 1f in accordance with the embodiment 6 although some component parts are omitted. The component parts which are common to those in the structure for each of the rotary electrical machines 1a to 1e described in the corresponding embodiments 1 to 5 are given like reference numerals. Those component parts will not be described below specifically.

The rotary electrical machine 1f has the multilayer structure consisting of a plurality of layers which are provided in the direction in which the first annular body or the second annular body where the permanent magnet 5 is not mounted faces opposite the second annular body or the first annular body where the permanent magnet 5 is mounted. At least one of those layers is formed as an annular body of any suitable magnetic material. In this respect, the rotary electrical machine 1f differs from the rotary electrical machine 1e in the embodiment 5 shown in FIG. 6.

More specifically, the rotary electrical machine 1f in accordance with the embodiment 6 is structured such that an annular body 13 made of any suitable magnetic material is provided on the inner circumference of the outer rotor 7 where the permanent magnet 5 is not mounted and which faces opposite the outer circumference of the inner rotor 4. Thus, the rotary electrical machine 1f has the multilayer structure consisting of a plurality of layers which are built one on another in the direction in which the outer rotor 7 faces opposite the inner rotor 4 where the permanent magnet 5 is mounted. At least one of those layers is formed as the annular body 13 made of any suitable magnetic material. In this respect, the rotary electrical machine 1f differs from the rotary electrical machine 1e in accordance with the embodiment 5 shown in FIG. 6.

In the embodiments 1 to 5, it is desirable that the coil 6 is interposed between the first annular body or the second annular body where the permanent magnet 5 is mounted and the second annular body or the first annular body where the permanent magnet 5 is not mounted and which faces opposite the first annular body or the second annular body in the radial direction of the axis of the rotating shaft 2 and that the second annular body or the first annular body is made of any suitable magnetic material. In this way, the magnetic field will be developed between the first annular body (inner rotor 4) and the second annular body (outer rotor 7).

In this embodiment 7, the multilayer structure described above and provided for forming the first annular body or the second annular body where the permanent magnet 5 is not mounted consists of a plurality of layers built one on another, at least one of which is formed as the annular body 13 made of any suitable magnetic material, Then, the component part included in the first annular body or the second annular body placed on the annular body 13 may be made of any suitable non-magnetic material.

Other than the component part described above, the rotary electrical machine 1f in accordance with the embodiment 6 shown in FIG. 7 includes the component parts that are common to those in the rotary electrical machine in accordance with the embodiment 5 shown in FIG. 6, and is not inferior to or, in other words, is functionally equivalent to the rotary electrical machine described in the embodiment 5 (FIG. 6).

More specifically, as described in the embodiments 1 to 5, either of the inner rotor 4 or specifically the first annular body and the outer rotor 7 or specifically the second annular body will never rotate together with the rotating body even when it is rotating. As such, the rotary electrical machine offered by the present invention can provide the smaller inertial action and the faster response time as compared with the conventional rotary electrical machine shown in FIG. 1 and based on the system in which both the inner rotor 4 and the outer rotor 7 rotate together when the rotating body from which the driving force of the motor is extracted is rotating.

In the embodiment 5 shown in FIG. 6, an eddy current may be produced in the outer rotor 7 facing opposite the permanent magnet 5 mounted on the outer circumference of the inner rotor 4 that will be rotated when the coil 6 is energized so that it can be conducted electrically. If such eddy current is produced, the outer rotor 7 that should not be rotated with the axis of the rotating shaft 2 and therefore with the inner rotor 4 might be rotated as if it would be brought about by the rotary movement of the inner rotor 4 because the outer rotor 7 is supported rotatably on the axis of the rotating shaft 2.

In the embodiment 6, the outer rotor 7 in the form of the annular body where the permanent magnet 5 is not mounted has the multilayer structure consisting of a plurality of layers built one on another, at least one of which is formed as the annular body 13 made of any suitable magnetic material. As such, any eddy current that might be produced in the outer rotor 7 can be reduced when the inner rotor 4 rotates. In this way, the possibility that the rotation of the outer rotor 7 might be brought about by the rotary movement of the inner rotor 4 can be decreased accordingly when the inner rotor 4 is rotating. The response performance (time) provided by the rotary electrical machine in accordance with the embodiment 6 can thus be higher than the rotary electrical machine 1e in accordance with the embodiment 5 shown in FIG. 6.

In the embodiment 1, the results obtained by comparing with the conventional rotary electrical machine have been described by referring to FIG. 15. It may be apparent from those results that for the response time, the rotary electrical machine of the present invention has been improved over the conventional rotary electrical machine 1i shown in FIG. 1 and in which the inner yoke and the outer yoke rotate together, and is not inferior to or, in other words, is functionally equivalent to the conventional rotary electrical machine in which the outer yoke is fixed and therefore is non-rotational. For the efficiency, it is found that the rotary electrical machine of the present invention has been improved over the conventional rotary electrical machine in which the outer yoke is fixed and is therefore non-rotational, and is not inferior to or, in other words, is functionally equivalent to the conventional electrical machine shown in FIG. 1 and in which the inner yoke and outer yoke rotate together.

More advantageously, the rotary electrical machine described above in accordance with each of the embodiments of the present invention should have the multilayer structure consisting of a plurality of layers built one on another in which the first annular body or the second annular body where the permanent magnet 5 is not mounted is built on the second annular body or the first annular body where the permanent magnet 5 is mounted so that they face opposite the corresponding first or second annular body and at least one of which is formed as the annular body made of any suitable magnetic material.

It is seen from the embodiment 6 shown in FIG. 7 that the annular plate body 13 included in the outer rotor 7 is arranged insides the axis of the rotating shaft 2 in the radial direction thereof so that it can be located nearer to the permanent magnet 5 mounted on the outer circumference of the rotating inner rotor 4, facing opposite the permanent magnet 5. The component part of the outer rotor 7 that is built on the annular plate body 13 may be made of any suitable non-magnetic material, and the annular plate body 13 may also be located outside the axis of the rotating shaft 2 in the radial direction thereof.

In the embodiments 1 to 5 described above, the first annular body (inner rotor 4) or the second annular body (outer rotor 7) where the permanent magnet 5 is not mounted may have the multilayer structure consisting of a plurality of layers built one on another, at least one of which may be formed as the annular body 13 made of any suitable magnetic material. In this way, any eddy current that may be produced in the first annular body (inner rotor 4) or the second annular body (outer rotor 7) having such multilayer structure can be reduced. It is thus possible to decrease the possibility that the first annular body (inner rotor 4) or the second annular body (outer rotor 7) having the multilayer structure and which should not be rotated with the rotating body when the rotating body from which the driving force of the motor is extracted is rotating might be brought about by the rotary movement of the corresponding second annular body (outer rotor 7) or the corresponding first annular body (inner rotor 4) where the permanent magnet 5 is mounted. This can enhance the response property (time) of the rotary electrical machine.

As one example of its application, the rotary electrical machine 1f shown in FIG. 7 may also be used as the servomotor that provides the improved response property.

Embodiment 7

Figure 8:
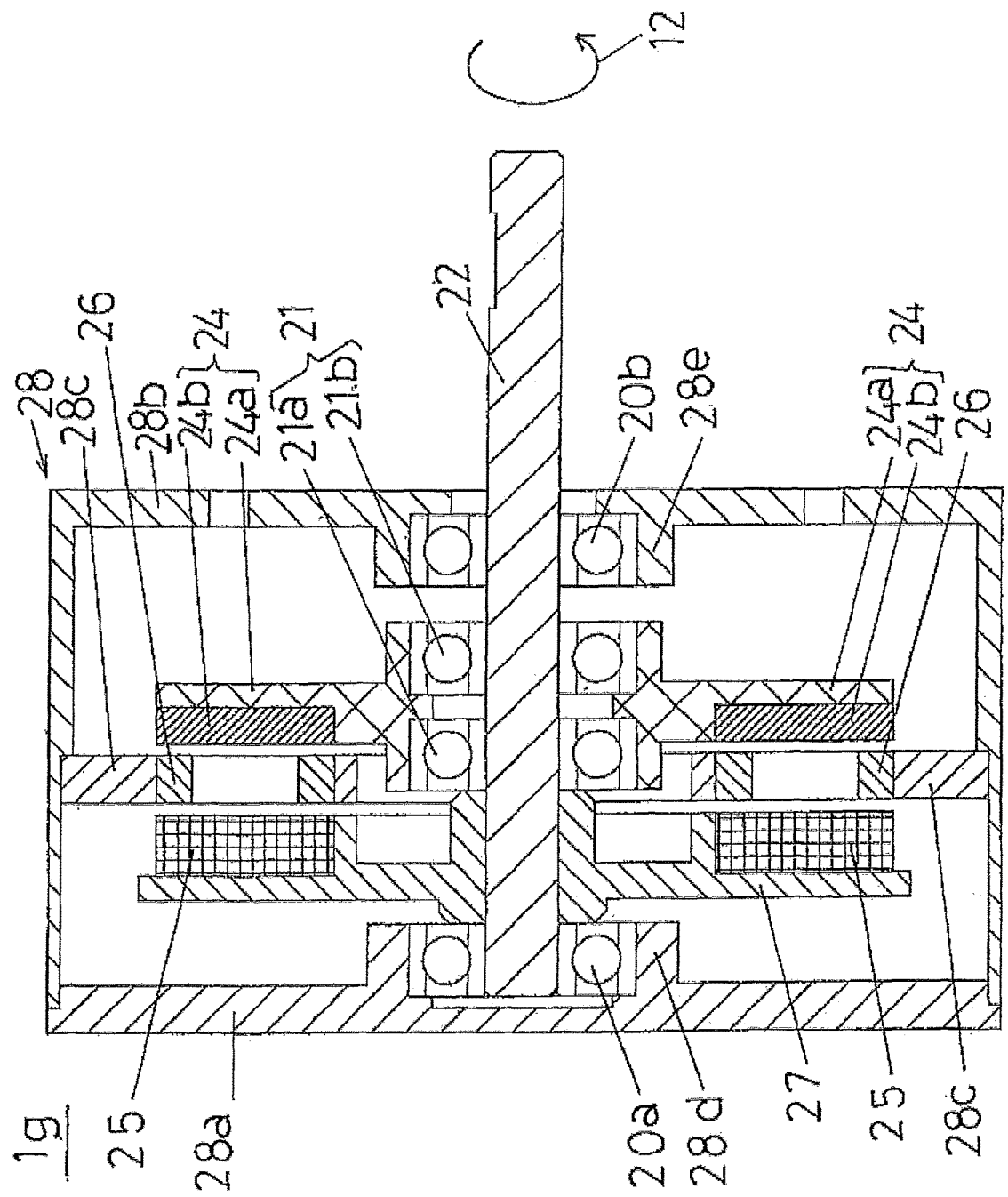
FIG. 8 is a sectional view illustrating the rotary electrical machine in accordance with the embodiment 7 of the present invention although some component parts are omitted.
Figure 9:
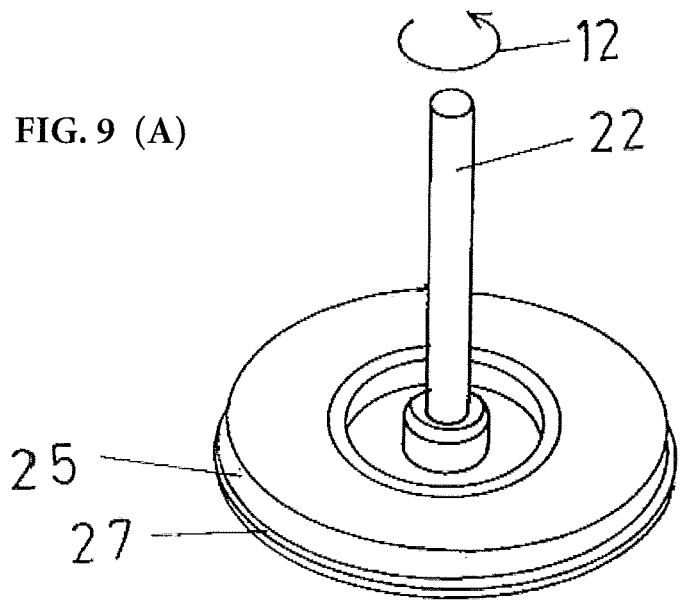
FIGS. 9(A) and 9(B) are diagrams illustrating the internal structure for the rotary electrical machine in accordance with the embodiment 7 of the present invention, in which (a) is a perspective view that shows the state in which a permanent magnet having an annular shape is mounted on the annular body rotating with the axis of the rotating shaft and (b) is a perspective view that illustrates one example of the arrangement in which a coil may be located above the annular permanent magnet shown in (a)
Figure 9:
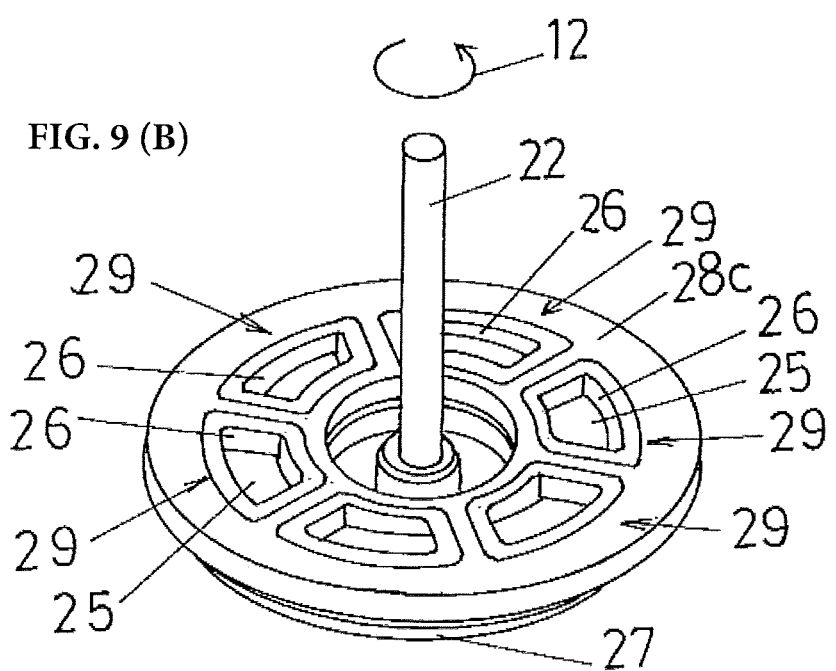

FIG. 8 is a sectional view illustrating the embodiment 7 of the present invention although some component parts are omitted.

The rotary electrical machine that has been described in accordance with each of the embodiment 1 to 6 has the cylindrical-type construction.

The embodiment 7 shown in FIG. 8, FIG. 9(A) and FIG. 9(B) that will be described below presents one example of the present invention that may be applied to the flat-type motor.

The embodiment 7 shown in FIG. 8, FIG. 9(A) and FIG. 9(B) presents the system in which the driving force of the motor can be extracted from the axis of the rotating shaft 22 acting as the rotating shaft.

As shown, the axis of the rotating shaft 22 acting as the rotating shaft is supported rotatably within a housing 28 by means of a bearing unit 20a and a bearing unit 20b. In the embodiment shown, there are supporting portions 28d, 28e each of which is formed to extend from the respective lateral wall 28a, 28b of the housing 28 toward the inner side of the housing along the axis of the rotating shaft 22. By means of the bearing unit 20a and 20b mounted within the respective supporting portions 28d, 28e, the housing 28 is supported rotatably on the axis of the rotating shaft 22.

The housing 28 has a central wall 28c on which gaps 29 are so formed that they are spaced away from each other at a predetermined interval in the circumferential direction with the axis of the rotating shaft 22 extending through the center. Each of the gaps 29 accommodates a coil 26 as shown in FIG. 9(B).

The first annular body 24 and the second annular body 27 are provided so that they face opposite each other with the coil 26 interposed therebetween. An annular permanent magnet 25 is mounted on the side of the second annular body 27 facing opposite the first annular body 24.

In this way, a magnetic field may be developed between the first annular body 24 and the second annular body 27 with the coil 26 interposed therebetween.

The second annular body 27 in which the annular permanent magnet 25 is mounted on the side thereof facing opposite the first annular body 24 is provided in such a way that it can rotate with the axis of the rotating shaft 22 extending through the center.

The first annular body 24 in which the permanent magnet is not mounted has the multilayer construction consisting of a plurality of layers built one on another in the direction facing opposite the second annular body 27, at least one of which is formed as an annular body 24b made of any suitable magnetic material.

The side of an annular supporting portion 24a formed by another layer for supporting the annular body 24b on which the axis of the rotating shaft 22 extends is supported rotatably on the axis of the rotating shaft 22 by means of a bearing unit 21a and a bearing unit 21b.

As described above, the first annular body 24 is supported rotatably on the axis of the rotating shaft 22.

When the coil 26 is energized so that it can be conducted electrically, it causes an electromagnetic force to be developed in the magnetic field formed between the first annular body 24 and the second annular body 27, causing the permanent magnet 25 to rotate in the direction of an arrow 12 under the action of the developed electromagnetic force.

As the permanent magnet 25 rotates, the second annular body 27 and the axis of the rotating shaft 22 will also rotate in the direction of the arrow 12.

It is noted, however, that the first annular body 24 will never rotate together with the second annular body and the axis of the rotating shaft 22 even when they are rotating. This is because the first annular body 24 is supported rotatably on the axis of the rotating shaft 22.

Because the first annular body 24 will never rotate with the axis of the rotating shaft 22 even when it is rotating, the rotary electrical machine in accordance with this embodiment provides the smaller inertial action as compared with the conventional rotary electrical machine shown in FIG. 1 and based on the system in which the first annular body and the second annular body rotate together.

According to this embodiment, therefore, the response time from the time when the coil 26 is energized so that it can be conducted electrically to the time when the axis of the rotating shaft 22 can reach its assumed number of revolutions can become faster than the conventional flat-type motor in which the first annular body and the second annular body rotate together.

As one example of its application, the flat-type motor shown in FIG. 8, FIG. 9(A) and FIG. 9(B) may be used as the servomotor that provides the improved response property (time).

Embodiment 8

Figure 10:
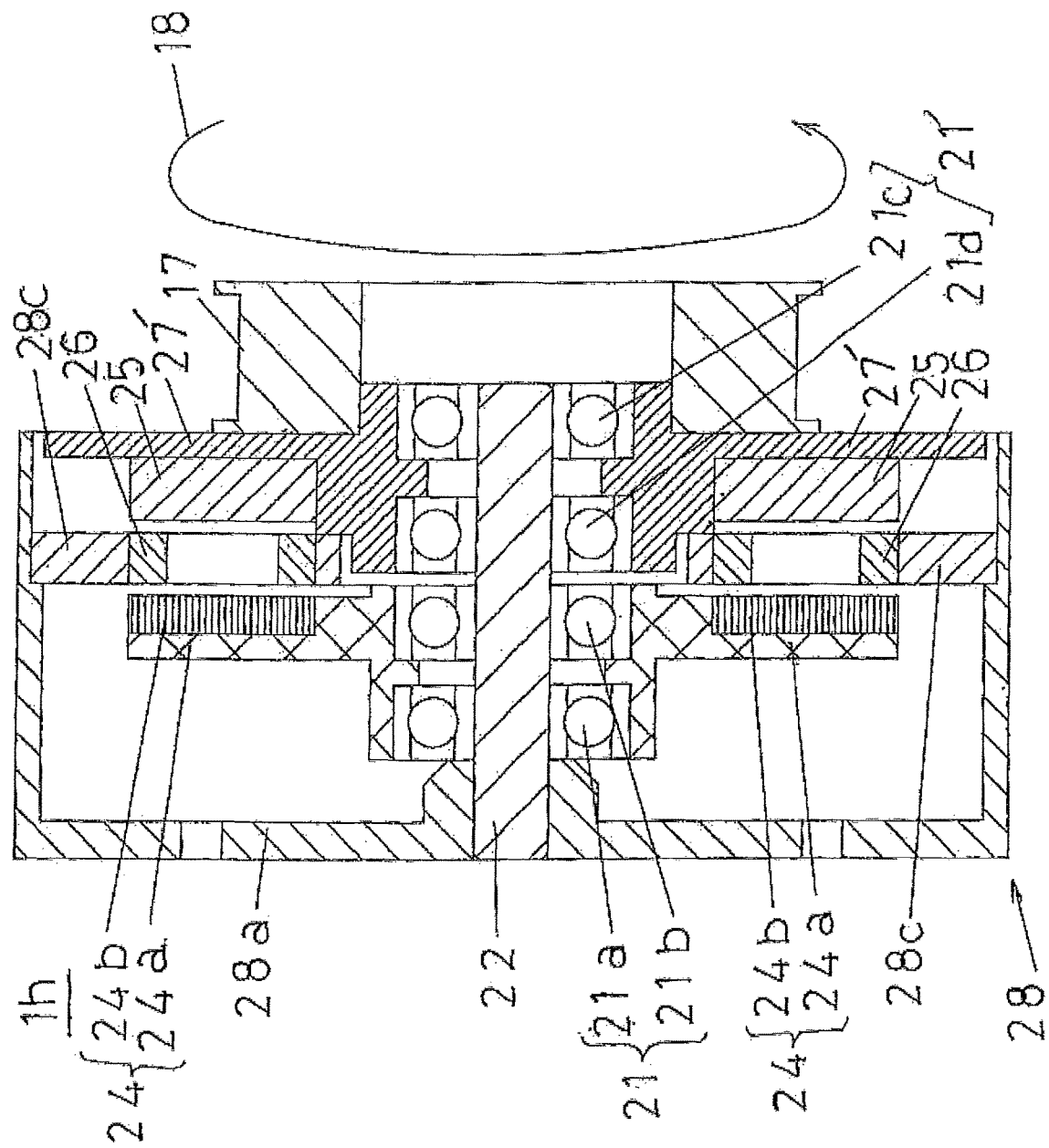
FIG. 10 is a sectional view illustrating the rotary electrical machine in accordance with the embodiment 7 of the present invention although some component parts are omitted.

FIG. 10 is a sectional view illustrating the embodiment 8 of the present invention although some component parts are omitted.

In the embodiment 7 shown in FIG. 8, FIG. 9(A) and FIG. 9(B), the system in which the driving force of the motor can be extracted from the axis of the rotating shaft acting as the rotating shaft has been described. It is noted, however, that the flat-type motor shown in FIG. 10 is based on the so-called direct drive system in which the driving force of the motor can be extracted from the second annular body that act as the rotating body where the annular permanent magnet is mounted.

The component parts that are common to those in the embodiment shown in FIG. 8, FIG. 9(A) and FIG. 9(B) are given like reference numerals. Those component parts will not be described below specifically.

The axis of the rotating shaft 22 is supported rotatably in the housing 28.

Similarly to the structure described in the embodiment 7, the housing 28 has the central wall 28c which includes coils 26 that are spaced away from each other at a predetermined interval in the circumferential direction with the axis of the rotating shaft 22 extending through the center.

The first annular body 24 and the second annular body 27' are provided so that they face opposite each other. The annular permanent magnet 25 is mounted on the side of the second annular body 27' facing opposite the first annular body 24.

In this way, the magnetic field is formed between the first annular body 24 and the second annular body 27' that face opposite each other with the coil 26 interposed therebetween.

The first annular body 24 where the permanent magnet is not mounted has the multilayer structure consisting of a plurality of layers built one on another in the direction facing opposite the second annular body 27', at least one of which is formed as the annular body 24b made of any suitable magnetic material.

The side of an annular supporting portion 24a formed by another layer for supporting the annular body 24b on which the axis of the rotating shaft 22 extends is supported rotatably on the axis of the rotating shaft 22 by means of a bearing assembly 21 (which includes a bearing unit 21a and a bearing unit 21b).

In this way, the first annular body 24 is supported rotatably on the axis of the rotating shaft 22.

The second annular body 27' is also supported rotatably on the axis of the rotating shaft 22 by means of the bearing assembly 21' (which includes the bearing unit 21c and the bearing unit 21d).

When the coil 26 is energized so that it can be conducted electrically, it causes the electromagnetic force to be developed in the magnetic field formed between the first annular body 24 and the second annular body 27' and the permanent magnet 25 is then rotated in the direction of an arrow 18 under the action of the developed electromagnetic force, for example.

As the permanent magnet 25 is rotated, the second annular body 27' will also be rotated in the direction of the arrow 18. The power for driving the motor may be extracted through the combination of the belt (not shown) and the pulley 17 mounted on the second annular body 27', As described above, the first annular body 24 will never rotate with the second annular body 27' even when it is rotating because the first annular body 24 is supported rotatably on the axis of the rotating shaft 22.

Since the first annular body will never rotate with the second annular body 27' even when it is rotating, the rotary electrical machine offered by this embodiment provides the reduced inertial action as compared with the conventional rotary electrical machine shown in FIG. 1 and based on the system in which the first annular body and the second annular body rotate together.

In this way, the response time from the time when the coil 26 is energized so that it can be conducted electrically to the time when the second annular body 17' can reach its assumed number of revolutions can become faster than the conventional flat-type motor based on the system in which the first annular body and the second annular body rotate together.

As one example of its application, the flat-type shown in FIG. 10 may also be used as the servomotor that provides the improved response property (time), for example.

Embodiment 9

As described in the embodiment 6 shown in FIG. 7, the first annular body (inner rotor 4) or the second annular body (outer rotor 7) where the permanent magnet 5 is not mounted may have the multilayer structure consisting of a plurality of layers built one on another in which the above first or second annular body is built on the corresponding second or first annular body where the permanent magnet 5 is mounted in the direction facing opposite each other. At least one of those layers may be formed as an annular body made of any suitable magnetic material. The energy efficiency can thus be enhanced.

In this embodiment 9, several embodiments of the annular body 13 will be described below by referring to FIG. 11 to FIG. 14.

It is desirable that the annular body 13 made of any suitable magnetic material should be made of any material having the great resistance and the high magnetic permeability in order to prevent any eddy current from being produced as described above. As an example of the annular body 13, the electromagnetic steel plate may be used.

Figure 11:
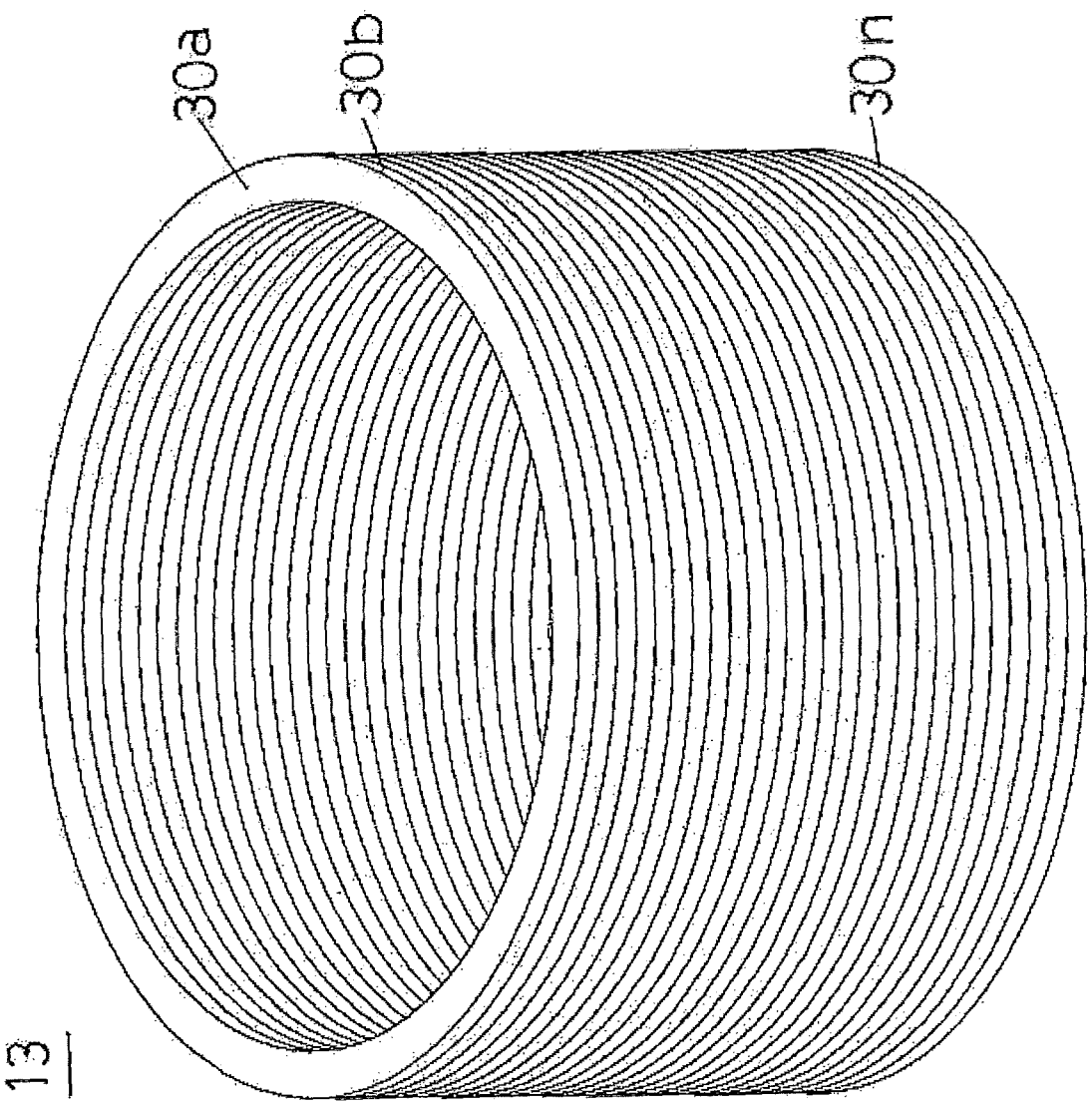
FIG. 11 is a perspective view illustrating one form 1 of the annular body made of any suitable magnetic material and which may be employed in the rotary electrical machine of the present invention.

The annular body 13 shown in FIG. 11 has the multilayer structure in which annular thin plates 30a, 30b . . . 30n each having the electromagnetic steel plate form are built one on another in the axial direction in which the axis of the annular body 13 is extended (that is, in the vertical direction in FIG. 11).

For example, the annular body 13 may have the multilayer structure that includes annular electromagnetic steel plates 30a, 30b, . . . 30n each having the thickness of 0.1 mm to 0.5 mm and which are built one on another in the axial direction (this is, the vertical direction in FIG. 11). The annular body 13 thus obtained can be 2.0 mm to 3.0 mm thick.

It is desirable that the annular body 13 has the multilayer structure that includes thin ring-like members built one on another and in which any two adjacent to each other are not electrically connected. In this way, any eddy current that may be produced as described can be prevented.

Figure 12:
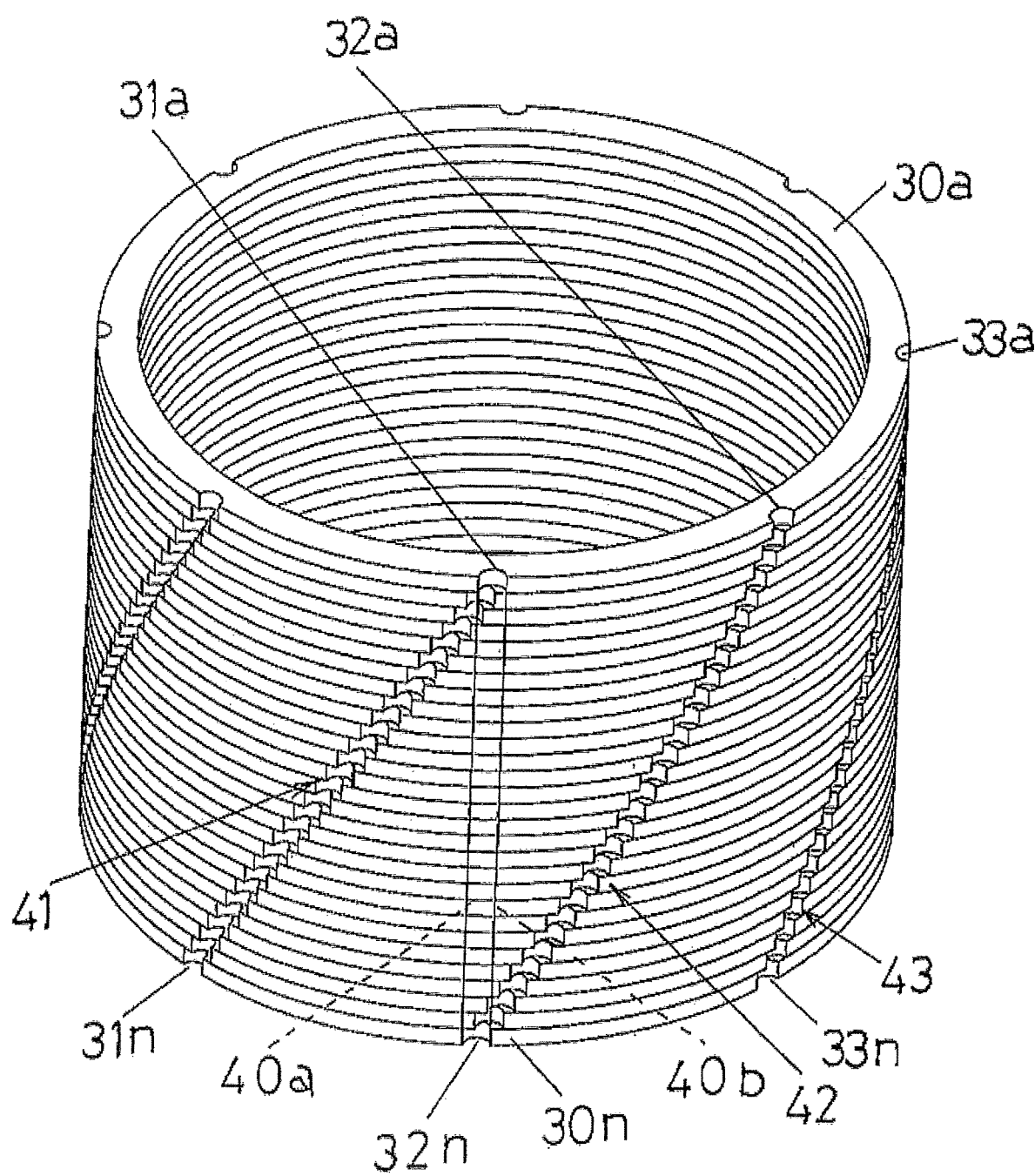
FIG. 12 is a perspective view illustrating another form 2 of the annular body made of any suitable magnetic material and which may be employed in the rotary electrical machine of the present invention.
Figure 13:
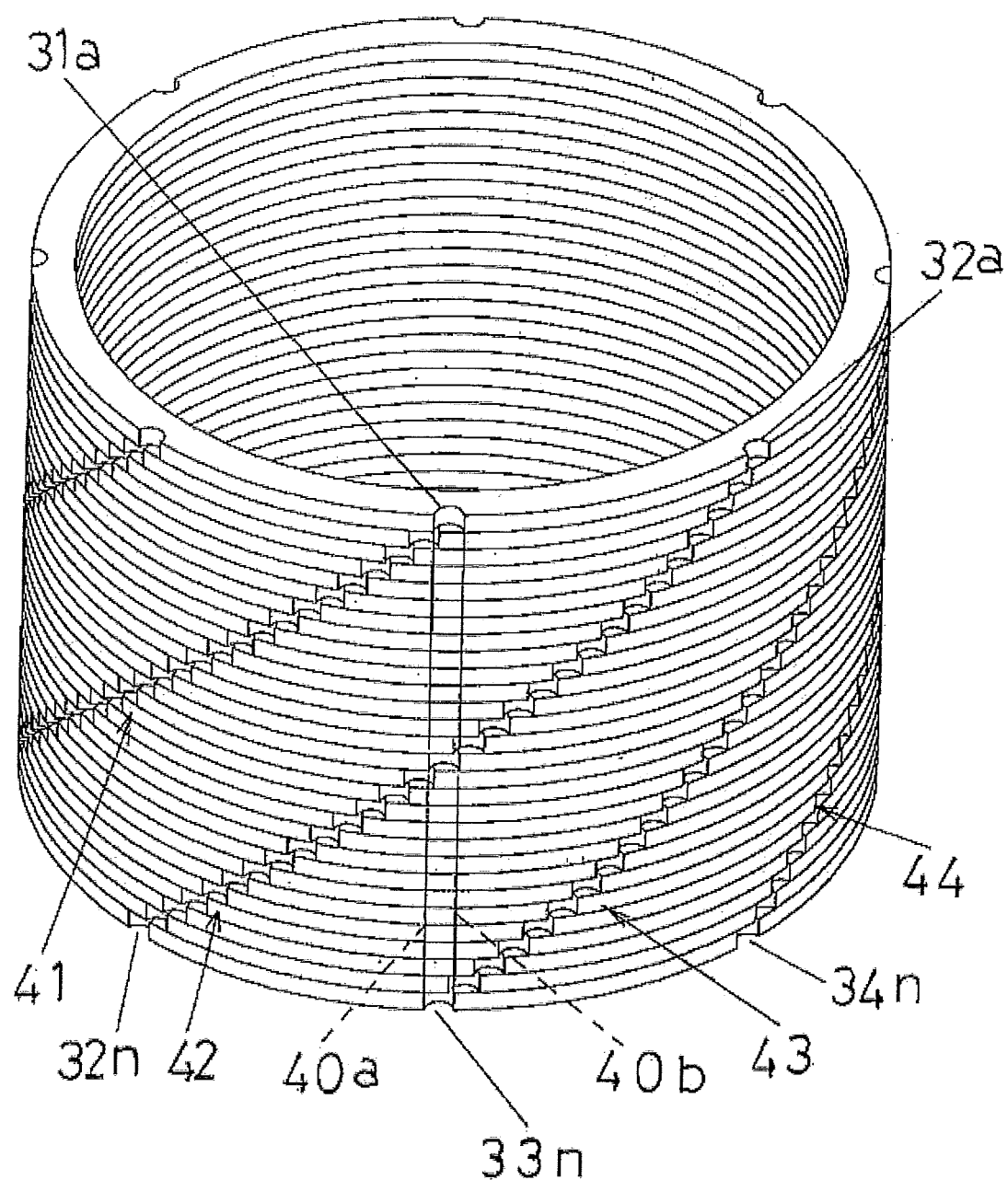
FIG. 13 is a perspective view illustrating still another form 3 of the annular body made of any suitable magnetic material and which may be employed in the rotary electrical machine of the present invention.
Figure 14:
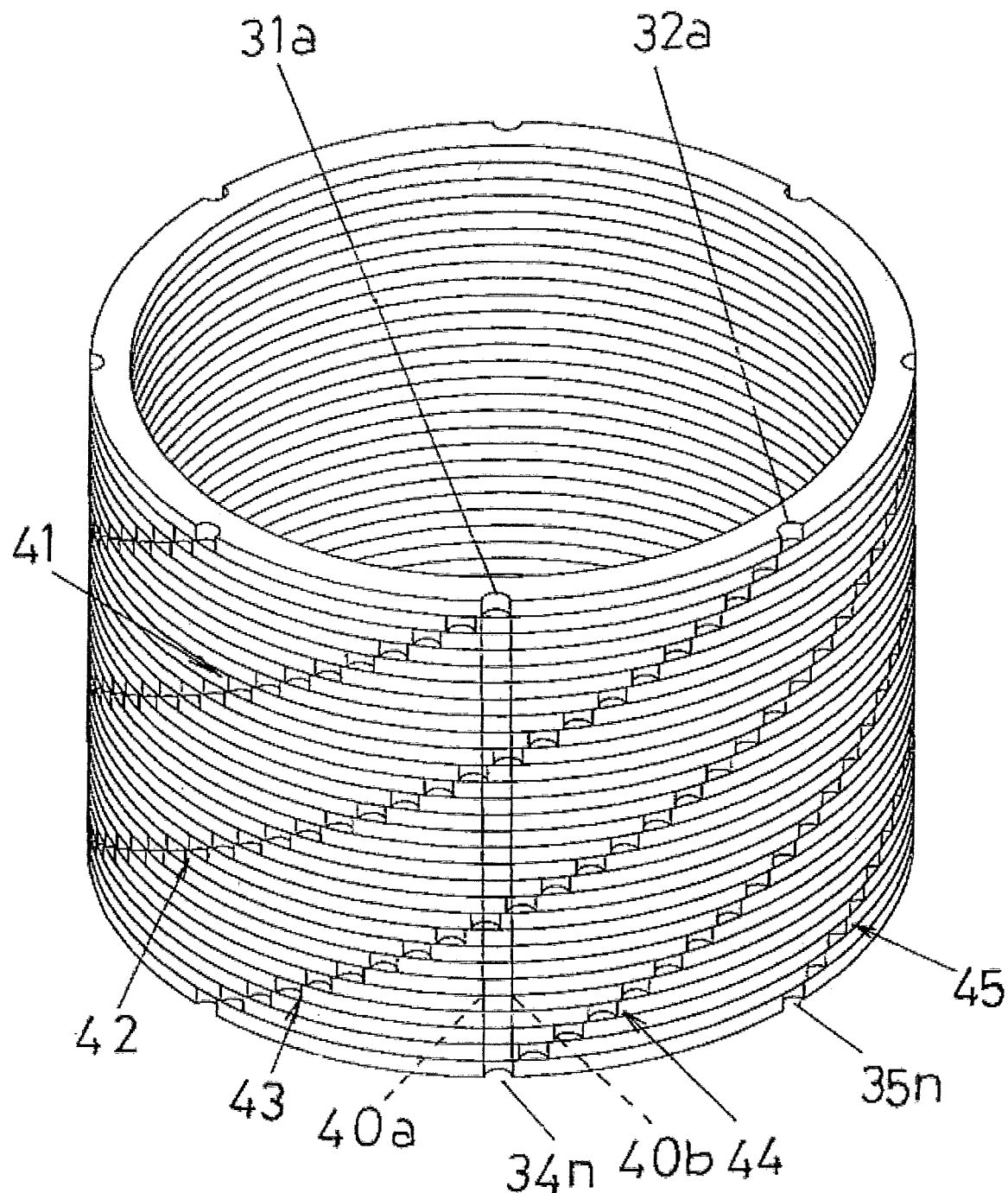
FIG. 14 is a perspective view illustrating further another form 4 of the annular body made of any suitable magnetic material and which may be employed in the rotary electrical machine of the present invention.

It is also desirable that the annular body 13 having the structure such as the one shown in FIG. 13 further includes a grooved portion. For example, this grooved portion may be provided for each of the ring-like members built one on another so that it is formed in its specific location in the circumferential direction. As shown in FIG. 12, the locations of those grooved portions formed on the corresponding ring-like members may be shifted slightly relative to each other in the circumferential direction. It is then desirable that the location of the beginning end 31a of the groove portion 41 formed on the annular body 13a is aligned with the location of the terminating end 32n of the adjacent grooved portion 42 in the circumferential direction of the annular body 13.

In FIG. 12, the lines indicated by the symbols 40a and 40b show that the location of the beginning end 31 of a particular grooved portion 41 is aligned with the location of the terminating end 32n of the adjacent grooved portion 42 in the circumferential direction of the annular body 13.

It is required that each of the ring-like members should be fixed in the radial direction by means of any plastic molding or welding method. For this reason, if those grooved portions or welded portions are provided in the straight line manner, therefore, it would cause the magnetic flux to vary accordingly and any magnetic stones would be attached to the grooved portions or welded portions. This would cause the cogging effect to occur between the first annular body (inner rotor 4, for example) and the second annular body (outer rotor 7, for example). To prevent such situation from occurring, the groove portion has the skewed structure in which the locations of the grooved portions formed in the ring-like members built one on another are to be shifted slightly relative to each other in the circumferential direction and the location of the beginning end of one grooved portion formed on the annular body 13a is to be aligned with the location of the terminating end of another adjacent grooved portion in the circumferential direction of the annular body 13.

As seen from FIG. 12, the location of the beginning end of any one grooved portion in the circumferential direction of the annular body 13 is aligned with the location of the terminating end of another adjacent grooved portion in the circumferential direction of the annular body 13. As seen from FIG. 13, the location of the beginning end of every second grooved portion is aligned with the location of the terminating end of another adjacent grooved portion in the circumferential direction of the annular body 13. As seen from FIG. 14, the location of the beginning end of every third grooved portion is aligned with the location of the terminating end of another adjacent grooved portion in the circumferential direction of the annular body 13.

Although the present invention has been described with reference to several specific preferred embodiment thereof shown in the accompanying drawings, it should be understood that the present invention is not limited to those embodiments and may be modified in numerous ways or manners without departing from the scope and spirit of the invention as defined in the appended claims.

DESCRIPTION OF REFERENCE NUMERALS

The following is a list of the reference numerals referred to in the specification and the accompanying drawings:
1a, 1b, 1c, 1d, 1e, 1f, 1g Rotary electrical machine
1i Conventional rotary electrical machine
2 Axis of the rotating shaft
3, 14 Hub
4 Inner rotor
5 Permanent magnet
6 Coil
7 Outer rotor
7a, 7b, 7c Supporting portion
8 Housing
9 Bearing assembly
9a, 9b, 9d Bearing unit
10 Bearing assembly
10a, 10b Bearing unit
11 Protective cover
13, 13a, 13b, 13c Annular body
14 Bearing assembly
15a, 15b Bearing unit
16 Bearing assembly
16a, 16b Bearing unit
20a, 20b, 21a, 21b Bearing unit
22 Axis of the rotating shaft
24 First annular body
24a Annular supporting portion
24b Annular body made of magnetic material
25 Annular permanent magnet
26 Coil
27, 27 Second annular body
28 Housing
28c Central wall on the housing
29 Gap
30a, 30b . . . 30f Thin ring-like member
31a, 32a Grooved portion on the thin ring-like member 30a
31n, 32n Grooved portion on the thin ring-like member 30n
41, 42, 43, 44, 45 Grooved portion
40a, 40b Imaginary line

The invention claimed is:
1. A rotary electrical machine, comprising:
a first annular body and a second annular body facing opposite each other;
a coil interposed between the first annular body and the second annular body;
a permanent magnet mounted on one of the first annular body and the second annular body;
a rotating shaft having an axis;
both of said first annular body and said second annular body being capable of rotating about an axis of the rotating shaft provided commonly to said first annular body and said second annular body;
said first annular body or said second annular body on which said permanent magnet is mounted being rotatable about the axis of said rotating shaft together with said permanent magnet that is rotated when said coil is energized so that it can be conducted electrically in a magnetic field developed by said permanent magnet between said first annular body and said second annular body; and
the driving force of a motor being extracted through said rotating shaft which rotates with said first annular body or said second annular body while it is rotating, wherein:
a driving force of the motor is extracted via said rotating shaft which rotates with said first annular body, while said second annular body is arranged rotatably with regard to said rotating shaft independently of the rotations of said rotating shaft and said first annular body; or
a driving force of the motor is extracted via said rotating shaft which rotates with said second annular body, while said first annular body is arranged rotatably with regard to said rotating shaft independently of the rotations of said rotating shaft and said second annular body.

2. The rotary electrical machine as defined in claim 1, wherein
said rotating shaft is supported within a housing;
said first annular body is arranged concentrically relative to said rotating shaft;
said second annular body is arranged concentrically relative to said rotating shaft and is located inside or outside said first annular body in a radial direction of said rotating shaft;
said coil is arranged concentrically on said rotating shaft and is located between said first annular body and said second annular body; and
said permanent magnet is arranged on a circumferential side of either of said first annular body and said second annular body facing opposite the other corresponding second annular body or first annular body.

3. The rotary electrical machine as defined in claim 1, wherein
said rotating shaft is supported rotatably within a housing;
said coil is supported within said housing;
said first annular body and said second annular body are arranged so that they can face opposite each other in the axial direction of said rotating shaft in which it is extended and with said coil interposed therebetween;

either of said first annular body and said second annular body is supported rotatably with regard to said rotating shaft and the other corresponding second annular body or first annular body is supported on said rotating shaft;

said rotating shaft is rotated by causing said first annular body or said second annular body that is supported rotatably on said rotating shaft to be rotated about the axis of the rotating shaft; and the driving force of the motor is extracted through said rotating shaft while it is rotating.

4. The rotary electrical machine according to claim 1, wherein the first annular body and the second annular body are each configured so the rotating force by one of the first annular body and the second annular body will not be transferred to the other of the first annular body and the second annular body.

\* \* \* \* \*